United States Patent
Dayton et al.

(10) Patent No.: US 10,155,908 B2
(45) Date of Patent: Dec. 18, 2018

(54) CATALYST COMPOSITIONS AND USE THEREOF IN CATALYTIC BIOMASS PYROLYSIS

(71) Applicant: RESEARCH TRIANGLE INSTITUTE, Research Triangle Park, NC (US)

(72) Inventors: David C. Dayton, Chapel Hill, NC (US); Maruthi Sreekanth Pavani, Morrisville, NC (US); John R. Carpenter, III, Apex, NC (US); Matthew Von Holle, Apex, NC (US)

(73) Assignee: RESEARCH TRIANGLE INSTITUTE, Research Triangle Park, NC (US)

( * ) Notice: Subject to any disclaimer, the term of this patent is extended or adjusted under 35 U.S.C. 154(b) by 522 days.

(21) Appl. No.: 14/649,540

(22) PCT Filed: Dec. 4, 2013

(86) PCT No.: PCT/US2013/072948
§ 371 (c)(1),
(2) Date: Jun. 3, 2015

(87) PCT Pub. No.: WO2014/089131
PCT Pub. Date: Jun. 12, 2014

(65) Prior Publication Data
US 2015/0307786 A1    Oct. 29, 2015

Related U.S. Application Data

(60) Provisional application No. 61/733,142, filed on Dec. 4, 2012.

(51) Int. Cl.
*B01J 21/04* (2006.01)
*B01J 21/06* (2006.01)
(Continued)

(52) U.S. Cl.
CPC ............... *C10B 53/02* (2013.01); *B01J 23/24* (2013.01); *B01J 23/30* (2013.01); *B01J 23/74* (2013.01);
(Continued)

(58) Field of Classification Search
CPC ... B01J 21/04; B01J 21/06; B01J 21/12; B01J 23/42; B01J 23/44; B01J 23/462;
(Continued)

(56) References Cited

U.S. PATENT DOCUMENTS 5,689,005 A    11/1997    Hagemeyer et al.
5,792,340 A    8/1998    Freel et al.
(Continued)

FOREIGN PATENT DOCUMENTS

CN    1564711 A    1/2005
CN    101392179 A    3/2009
(Continued)

OTHER PUBLICATIONS

Channiwala, S., et al., "A unified correlation for estimated HHV of solid, liquid, and gaseous fuels", "Fuel", Aug. 28, 2001, pp. 1051-1063, vol. 81.
(Continued)

*Primary Examiner* — Patricia L. Hailey
(74) *Attorney, Agent, or Firm* — Hultquist, PLLC; Steven J. Hultquist

(57) ABSTRACT

A catalyst is described that is useful for catalytic pyrolysis of biomass to produce a pyrolysis product. The catalyst includes (i) matrix material comprising a support and/or binder, and (ii) at least one metal oxide on the matrix material, wherein the metal oxide comprises metal selected from the group consisting of tungsten, chromium, cobalt, molybdenum, nickel, and combinations thereof. Corresponding catalytic pyrolysis processes and catalytic pyroly-
(Continued)

sis apparatus are disclosed, in which the catalyst enables the production of low oxygen content, stable liquid intermediates that can be refined to make liquid hydrocarbon fuels.

10 Claims, 13 Drawing Sheets

(51) Int. Cl.

| | |
|---|---|
| B01J 21/12 | (2006.01) |
| B01J 23/42 | (2006.01) |
| B01J 23/44 | (2006.01) |
| B01J 23/75 | (2006.01) |
| C10B 53/02 | (2006.01) |
| B01J 23/30 | (2006.01) |
| B01J 35/10 | (2006.01) |
| B01J 35/00 | (2006.01) |
| C10B 49/22 | (2006.01) |
| C10G 1/08 | (2006.01) |
| B01J 23/24 | (2006.01) |
| B01J 23/74 | (2006.01) |
| B01J 38/30 | (2006.01) |
| B01J 23/94 | (2006.01) |
| B01J 23/92 | (2006.01) |

(52) U.S. Cl.
CPC ......... *B01J 35/002* (2013.01); *B01J 35/0026* (2013.01); *B01J 35/1014* (2013.01); *B01J 35/1019* (2013.01); *B01J 35/1038* (2013.01); *B01J 35/1042* (2013.01); *C10B 49/22* (2013.01); *C10G 1/086* (2013.01); *B01J 21/066* (2013.01); *B01J 23/92* (2013.01); *B01J 23/94* (2013.01); *B01J 38/30* (2013.01); *Y02E 50/14* (2013.01)

(58) Field of Classification Search
CPC . B01J 23/72; B01J 23/745; B01J 23/14; B01J 23/34; B01J 23/75; B01J 23/755; B01J 23/864; B01J 23/866; B01J 23/882; B01J 23/883; B01J 23/888; B01J 29/04; B01J 35/023; B01J 35/0026; B01J 35/0014; B01J 35/1019; B01J 35/1038; B01J 35/1042
USPC ....... 502/300, 303, 305, 315, 318, 319, 321, 502/324, 326, 330, 337–339
See application file for complete search history.

(56) References Cited

U.S. PATENT DOCUMENTS

| | | | |
|---|---|---|---|
| 9,381,500 B2* | 7/2016 | Zhou | B01J 23/96 |
| 9,688,602 B2* | 6/2017 | Dakka | C07C 67/08 |
| 2008/0183019 A1* | 7/2008 | Redlingshofer | B01J 23/30 |
| | | | 568/41 |
| 2008/0319236 A1* | 12/2008 | McNeff | C07C 41/09 |
| | | | 568/698 |
| 2009/0139137 A1 | 6/2009 | Ikura et al. | |
| 2009/0165378 A1 | 7/2009 | Agblevor | |
| 2009/0227823 A1 | 9/2009 | Huber et al. | |
| 2009/0239279 A1 | 9/2009 | Hall et al. | |
| 2010/0076238 A1 | 3/2010 | Brandvold et al. | |
| 2010/0170147 A1* | 7/2010 | McNeff | C10B 19/00 |
| | | | 44/605 |
| 2010/0251615 A1 | 10/2010 | Marker et al. | |
| 2011/0201855 A1 | 8/2011 | Marinangeli et al. | |
| 2011/0232166 A1 | 9/2011 | Kocal | |
| 2011/0245543 A1 | 10/2011 | Cortright et al. | |
| 2011/0315931 A1 | 12/2011 | Aradi et al. | |
| 2011/0318932 A1 | 12/2011 | Monson et al. | |
| 2012/0142520 A1* | 6/2012 | Bartek | B01J 21/16 |
| | | | 502/71 |
| 2012/0190062 A1 | 7/2012 | O'Connor et al. | |
| 2012/0232299 A1 | 9/2012 | Bartek et al. | |
| 2012/0283459 A1 | 11/2012 | Kim et al. | |
| 2012/0305836 A1* | 12/2012 | Traynor | C10G 65/04 |
| | | | 252/182.12 |
| 2013/0144087 A1* | 6/2013 | Arora | C07C 29/147 |
| | | | 568/884 |
| 2013/0178661 A1* | 7/2013 | Zhou | B01J 37/0244 |
| | | | 568/885 |
| 2013/0178662 A1* | 7/2013 | Zhou | B01J 37/0205 |
| | | | 568/885 |
| 2013/0178663 A1* | 7/2013 | Zhou | B01J 37/0205 |
| | | | 568/885 |
| 2013/0178667 A1* | 7/2013 | Zhou | B01J 37/0205 |
| | | | 568/885 |
| 2013/0219774 A1* | 8/2013 | Venderbosch | B01J 23/002 |
| | | | 44/307 |
| 2015/0111723 A1* | 4/2015 | Bartek | C10G 1/00 |
| | | | 502/75 |
| 2015/0224485 A1* | 8/2015 | McGuire | B01J 29/80 |
| | | | 568/653 |
| 2017/0259252 A1* | 9/2017 | McGuire | B01J 37/04 |

FOREIGN PATENT DOCUMENTS

| | | |
|---|---|---|
| CN | 102015969 A | 4/2011 |
| JP | S58-194985 A | 11/1983 |
| JP | 2005-161134 A | 6/2005 |
| JP | 2008-201754 A | 9/2008 |
| JP | 2011-514927 A | 5/2011 |
| KR | 10-2009-0128537 A | 12/2009 |
| KR | 10-2010-0015425 A | 2/2010 |
| WO | 2010065872 A1 | 6/2010 |
| WO | 2010129170 A2 | 11/2010 |

OTHER PUBLICATIONS

Cocco, R., et al., "Jet cup attrition testing", "Powder Technology", Mar. 1, 2010, pp. 224-233, vol. 200.

Kourieh, R., et al., "Study of acidic commercial WOx/ZrO2 catalysts by adsorption microcalorimetry and thermal analysis techniques", "Journal of Thermal Analysis and Calorimetry", Aug. 28, 2009, pp. 849-853, vol. 99.

Kuznetsova, L. I., et al., "Textural Properties and Crystalline Structure of Tungstated Zirconia, a Catalyst for Isomerization of Lower Alkanes", "Petroleum Chemistry", Sep. 15, 2012, pp. 341-345, vol. 52, No. 5.

Baertsch, C. D., et al., "Isotopic and Chemical Titration of Acid Sites in Tungsten Oxide Domains Supported on Zirconia", "The Journal of Physical Chemistry B", Jan. 26, 2001, pp. 1320-1330, vol. 105, No. 7.

Sohn, J. R., et al., "Characterization of Zirconia-Supported Tungsten Oxide Catalyst", "Langmuir", Sep. 19, 1998, pp. 6140-6145, vol. 14, No. 21.

Turek, A. M., et al., "Acidic Properties of Alumina-Supported Metal Oxide Catalysts: An Infrared Spectroscopy Study", "The Journal of Physical Chemistry", 1992, pp. 5000-5007, vol. 96, No. 12.

Wang, M., et al., "Biomass Catalytic Pyrolysis with Ni Based Catalyst to Produce Hydrogen Rich Gas", "Journal of Northeast Agricultural University (English Edition)", Dec. 2010, pp. 43-49, vol. 17, No. 4.

Weingarten, R., et al., "Design of solid acid catalysts for aqueous-phase dehydration of carbohydrates: The role of Lewis and Bronsted acid sites", "Journal of Catalysis", Feb. 24, 2011, pp. 174-182, vol. 279.

Note: For the non-patent literature citations that no month of publication is indicated, the year of publication is more than 1 year prior to the effective filing date of the present application.

* cited by examiner

CATALYST COMPOSITIONS AND USE THEREOF IN CATALYTIC BIOMASS PYROLYSIS

CROSS-REFERENCE TO RELATED APPLICATIONS

This application is a U.S. national phase under the provisions of 35 U.S.C. § 371 of International Patent Application No. PCT/US13/72948 filed Dec. 4, 2013, which in turn claims the benefit of priority under 35 USC § 119 of U.S. Provisional Patent Application 61/733,142 filed Dec. 4, 2012 in the names of David C. Dayton, Maruthi Pavani, John R. Carpenter III, and Matthew Von Holle for "Catalyst Compositions and Use Thereof in Catalytic Biomass Pyrolysis". The disclosures of such international patent application and U.S. Provisional Patent Application No. 61/733,142 are hereby incorporated herein by reference, in their respective entireties, for all purposes. The disclosure of U.S. Provisional Patent Application 61/607,866 filed Mar. 7, 2012 is also incorporated herein by reference, in its entirety, for all purposes.

GOVERNMENT RIGHTS IN THE INVENTION

The present invention was made with United States Government support under Grant No. DE-AR0000021 awarded by the U.S. Department of Energy/Advanced Research Projects Agency-Energy (DOE/ARPA-E). The United States Government has certain rights in the invention.

FIELD

The present disclosure relates to catalyst compositions useful in thermochemical conversion of biomass to produce liquid bio-crude oil that can be upgraded to hydrocarbon products, e.g., transportation fuels, as well as to catalytic biomass pyrolysis systems and processes utilizing such catalyst compositions.

DESCRIPTION OF THE RELATED ART

In the effort to supplement and ultimately replace conventional fuels derived from decreasing petroleum supplies, increasing focus is being directed to fuels from renewable sources, including biological sources, i.e., biofuels. Currently, biofuels such as ethanol are largely produced from grains, but a large untapped resource of plant biomass exists in the form of lignocellulosic material, as a feedstock that is potentially useful for bioenergy and bioproducts production.

As compared to well-developed processes for converting grain starch content to sugars for subsequent conversion to ethanol, conversion of lignocellulose to biofuel is much more difficult. Pyrolysis is a thermochemical process that holds potential for production of liquid transportation fuels from biomass starting materials. Traditional biomass flash pyrolysis processes have demonstrated roughly 70% liquid product yield, but the pyrolysis oil product of such processes has limited use without additional upgrading or refining. Currently, commercial biomass pyrolysis processes are utilized primarily to produce commodity chemicals for the food products industry. Fuel usage of raw pyrolysis oils has been demonstrated for electric power production in boilers, diesel engines, and, with limited success, turbines.

Pyrolysis of biomass involves thermal depolymerization of biomass at moderate temperatures in the absence of added oxygen, and produces a mixture of solid, liquid and gaseous products, depending on the specific pyrolysis temperature and residence time conditions utilized in the process. Charcoal yields of up to 35% can be achieved by slow pyrolysis at low temperature, high pressure, and long residence times. Flash pyrolysis is employed to optimize production of liquids including water and oil. The flash pyrolysis product is commonly referred to as bio-crude. The bio-crude can be further processed, e.g., by phase separation to remove water therefrom, to yield bio-oil. In flash pyrolysis, high heating rates and short residence times facilitate rapid biomass pyrolysis while minimizing vapor cracking, to produce optimized liquid product yields with up to about 70% efficiency on a weight basis.

Bio-oil can be upgraded either at the source prior to full production, or after the formation of the liquid product. Currently, the most popular methods in post-production upgrading are oil cracking over solid acid catalysts, or hydrotreating in the presence of high pressure hydrogen and a hydrodesulfurization (HDS) catalyst. Although both oil cracking and hydrotreating processes hold the potential to achieve reduced oxygen content, both of such upgrading processes are accompanied by the loss of hydrogen, in the form of water, and carbon in the form of carbon monoxide and/or carbon dioxide.

Hydrodeoxygenation (HDO) is carried out at elevated temperature, e.g., temperatures on the order of 200-450° C., and in the presence of HDO catalysts such as sulfided CoMo or NiMo catalysts. Loss of oxygen in the form of water during hydrotreating, and saturation to increase the hydrogen/carbon (H/C) ratio, lead to a high hydrogen demand. Externally supplied hydrogen typically is added during this process at high pressure, e.g., pressures on the order of 3-12 MPa. Hydrogen requirements can be substantial, e.g., theoretically on the order of 41 kg per ton of biomass, a factor that renders HDO generally uneconomical. HDO can be conceptually characterized by the following equations:

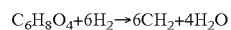

$$C_6H_8O_4 + 6H_2 \rightarrow 6CH_2 + 4H_2O$$

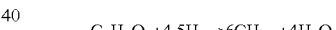

$$C_6H_8O_4 + 4.5H_2 \rightarrow 6CH_{1.5} + 4H_2O$$

Cracking reactions in bio-oils can occur at atmospheric pressure using acid catalysts. In catalytic cracking, deoxygenation can take place by one or more of dehydration, decarboxylation, and decarbonylation reactions. Dehydration reactions are chemical reactions that result in the loss of a water molecule ($H_2O$) from the reactant. Decarbonylation reactions are chemical reactions that result in the loss of the carbon monoxide molecule (CO) from the reactant. Decarboxylation reactions are chemical reactions that result in the loss of a carbon dioxide molecule ($CO_2$) from the reactant. Decarboxylation and decarbonylation reduce the oxygen content of the bio-oil by producing carbon dioxide and carbon monoxide respectively, increasing the heating value and density of the bio-oil. While carbon is lost during decarboxylation and decarbonylation, removal of oxygen as carbon dioxide or carbon monoxide reduces the hydrogen demand during hydroprocessing of the bio-oil. Dehydration, decarboxylation and decarbonlyation reactions can be controlled by modifying the reaction temperature, with lower temperatures favoring dehydration reaction, and higher temperatures favoring decarboxylation reaction.

A number of catalysts have been utilized in the catalytic cracking of pyrolysis oils. Examples include zeolites such as H-ZSM-5 and ultrastable Y-zeolite, mesoporous materials such as MCM-41 and Al-MCM-41, and heteropolyacids (HPAs). The primary disadvantage of heteropolyacids is that they are moderately soluble in polar solvents and lose their activity at higher temperatures as a result of loss of structural integrity. Major components of bio-oils (phenols, aldehydes, and carboxylic acids) have low reactivity on ZSM-5 and undergo thermal decomposition, producing coke. Zeolite catalysts also deactivate quickly by coke formation resulting from decomposition of large organic molecules present in bio-oil, which blocks the pores and decreases the number of available catalytic sites on such catalyst materials. The large amount of water vapor in bio-crudes also leads to dealumination of zeolite materials, which in turn results in loss of surface area and irreversible deactivation of such catalytic materials.

By comparison, catalytic cracking is regarded as a cheaper route for converting oxygenated feedstocks to lighter fractions. Nonetheless, catalytic cracking leads to higher coke formation levels, e.g., 8-25 weight percent, based on the weight of feedstock processed in the catalytic cracking process. Thus, unlike conventional upgrading of petroleum crude oil, upgrading of high oxygen content (e.g., 35-50%) bio-crude to produce suitable quality biofuels, using traditional catalysts, will result in significant loss of hydrogen and carbon and subsequently decrease the conversion efficiency of the process. During these upgrading processes, only a fraction of the carbon present in the raw bio-oil ends up in the upgraded bio-oil product.

As in petroleum crude oil processing, coke deposition and catalyst stability are critical issues in biomass processing and bio-crude upgrading over conventional catalysts. In some cases, conventional catalysts are wholly unsuitable for bio-crude or biomass processing.

As an example, conventional sulfided CoMo HDS catalysts used in petroleum oil refining operations may be unsuitable for bio-crude hydrotreating due to low sulfur content of the initial biomass feedstock. The low sulfur environment may result in reduction of sulfided CoMo or NiMo catalysts to elemental metal, followed by rapid coke deposition and catalyst deactivation. In such situation, the addition of sulfur donor compounds to the feedstock to maintain catalytic activity is undesirable, since it may substantially complicate the process and potentially add sulfur to the fuel product.

Cracking of bio-crude over acidic catalysts such as zeolites and supported metal oxides (e.g., alumina), which are susceptible to rapid deactivation due to coking, leads to relatively high yields of low molecular weight hydrocarbons, e.g., pentane and lower carbon number compounds.

Accordingly, improved catalysts with better stability and coke formation resistance with higher selectivity towards bio-oil formation are desirable for biomass conversion to bio-oil.

Considering the processing of bio-oil in further detail, removal of the remaining oxygen by dehydration would require over 80% of the hydrogen in the bio-oil if no external hydrogen were supplied. The resulting product would be more hydrogen deficient than coal. This underscores the practical necessity of adding substantial amounts of externally supplied hydrogen to make up for the hydrogen lost in the formation of water and to meet the need to increase the H/C ratio to a value in a range of from 1.9 to 2.4. For example, approximately 20 to 45 kg of hydrogen is required for one ton of biomass to yield a theoretical maximum of between 75 to 98 gallons of biofuel per ton of biomass. A number of analyses indicate that upgrading of bio-crude by hydrotreating may not be economically attractive because of the large volume of external hydrogen required. It will be appreciated that similar issues occur in upgrading of bio-crude by conventional cracking over acid catalysts.

Accordingly, conventional methodologies such as hydrotreating and cracking do not enable higher efficiencies to be achieved during conversion of biomass to upgraded bio-oil. In order to achieve high conversion efficiencies, a catalytic biomass pyrolysis process is desirable that selectively deoxygenates the biomass with minimal hydrogen and carbon loss.

The foregoing underscores the need for improved processes for transformation of biomass into high-value commodities and/or corresponding stable intermediates.

SUMMARY

The present invention relates to catalyst compositions having utility for thermochemical conversion of biomass to produce liquid bio-crude oil, and to catalytic biomass pyrolysis systems and processes utilizing such catalyst compositions.

In one aspect, the disclosure relates to a catalyst useful for catalytic pyrolysis of biomass, in which the catalyst comprises:
(i) matrix material comprising a support and/or binder, and
(ii) at least one metal oxide on the matrix material, wherein the metal oxide comprises metal selected from the group consisting of tungsten, chromium, cobalt, molybdenum, nickel, and combinations thereof.

In specific embodiments, the catalyst may be constituted so that Lewis acid and Brønsted acid sites are present on the catalyst such that the Lewis to Brønsted ratio is in a range of from 0.1 to 50 based on the ratio of pyridine absorption infrared band heights measured ($cm^{-1}/cm^{-1}$).

In another aspect, the disclosure relates to a catalyst useful for catalyzing pyrolysis of biomass, in which the catalyst comprises a zirconia support and tungsten oxide on the zirconia support at a tungsten oxide loading of from 10 to 20% by weight, based on total weight of zirconia and tungsten oxide.

Such tungstated zirconia catalyst in specific embodiments can be of particulate form with an average particle size in a range of from 20 to 150 μm, and with an acid site loading, as measured by ammonia adsorption, in a range of from 3 to 10 mL of $NH_3$ per gram of catalyst, wherein Lewis acid and Brønsted acid sites are present on the catalyst at a Lewis to Brønsted infrared band height ratio ($cm^{-1}/cm^{-1}$) in a range of from 0.1 to 50.

A further aspect the disclosure relates to a process for catalytic pyrolysis of biomass, comprising:
reacting a biomass starting material under pyrolysis conditions in the presence of a catalyst to yield a pyrolysis reaction product; and regenerating the catalyst used in the pyrolysis reaction, to remove coke deposited on the catalyst and yield regenerated catalyst for use in the pyrolysis reaction, in which the catalyst used in the process comprises catalyst of the present disclosure.

In a still further aspect, the disclosure relates to a system for catalytic pyrolysis of biomass, comprising a pyrolysis reactor adapted to react biomass starting material under pyrolysis conditions in the presence of catalyst to yield pyrolysis product, and a regenerator adapted to receive coked catalyst from the pyrolysis reactor and to regenerate same for recirculation to the pyrolysis reactor, wherein the pyrolysis reactor is provided with catalyst of the present disclosure.

Other aspects, features and embodiments of the disclosure will be more fully apparent from the ensuing description and appended claims.

DETAILED DESCRIPTION

Figure 1:
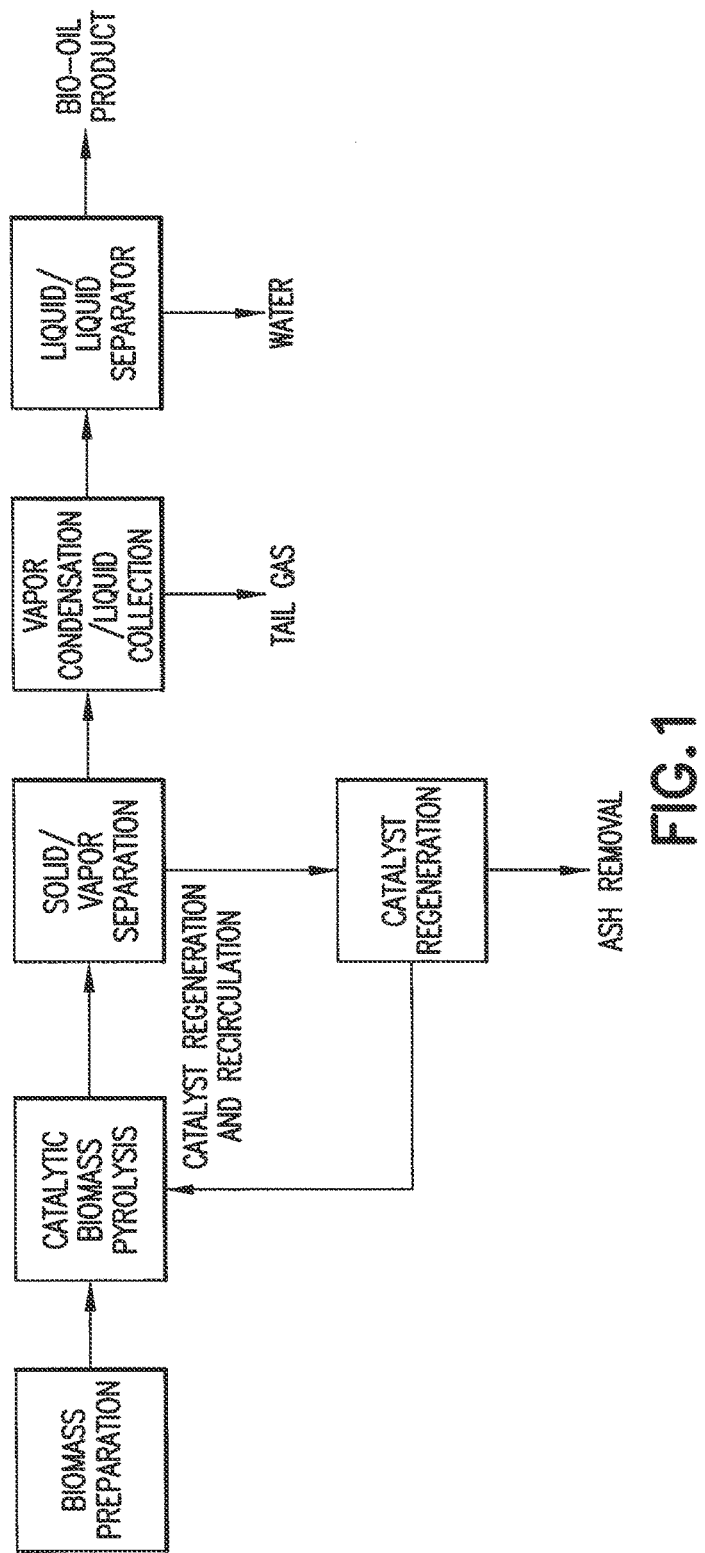
FIG. 1 is a block diagram of a catalytic biomass pyrolysis process system according to one embodiment of the present disclosure.

As used herein, the singular forms "a", "and", and "the" include plural referents unless the context clearly dictates otherwise.

As used herein, the term "bio-crude" refers to the fraction of reaction products obtained from a pyrolysis reaction that is liquid at ambient condition, and the term "bio-oil" refers to the organic fraction(s) of the liquid pyrolysis product (bio-crude liquid). The liquid pyrolysis product typically comprises water and a mixture of hydrophilic and hydrophobic phase organic compounds. This bio-crude may be processed to remove water and recover bio-oil. The bio-oil may then be processed in operations such as distillation and/or catalytic processing to transform it into a biofuel, such as bio-diesel, bio-gasoline, bio-jet fuel, or the like. In some instances, the bio-oil may have a composition that renders it suitable for co-processing with traditional petroleum crude oil or refinery intermediates like vacuum gas oil (VGO) or light-cycle oil (LCO) in existing oil refineries.

The disclosure, as variously set out herein in respect of specific features, aspects and embodiments, may in particular implementations be constituted as comprising, consisting, or consisting essentially of, some or all of such features, aspects and embodiments. Further, elements and components of such features, aspects and embodiments may be aggregated to constitute various further implementations of the disclosure.

The disclosure therefore contemplates such features, aspects and embodiments, and their constituent elements and components, or a selected one or ones thereof, in various permutations and combinations, as being within the scope of the disclosure.

The present disclosure relates to catalyst compositions useful in thermochemical conversion of biomass to produce liquid bio-crude oil that can be upgraded to hydrocarbon products, e.g., transportation fuels, as well as to catalytic biomass pyrolysis systems and processes utilizing such catalyst compositions.

The catalyst compositions of the disclosure have been demonstrated to produce low (<20 wt %) oxygen content bio-crude, while minimizing over-cracking and coke formation. Catalytic biomass pyrolysis processes utilizing such catalyst compositions can achieve bio-crude yields significantly in excess of 20%, and carbon conversion efficiency in the liquid product exceeding 40%.

The catalyst compositions of the present disclosure achieve an effective balance of catalytic activity and low coke formation susceptibility by an appropriate tunable ratio of Lewis acid and Brønsted acid sites. In various embodiments, the catalyst compositions include promoters that are effective to improve activity of the catalyst or to impart other desirable functional characteristics, such as increased hydrogen production and/or inhibition of coke formation in the use of the catalyst in biomass pyrolysis systems and processes.

Catalyst compositions of the disclosure are readily synthesized, as hereinafter discussed in greater detail. Such catalyst compositions may be utilized in catalytic processes such as catalytic fast pyrolysis, as well as other biomass pyrolysis processes. In some previously developed biomass pyrolysis processes, wherein reducing zones are employed, use of the catalyst compositions of the present disclosure may enable reducing zones to be eliminated without loss of yields or carbon conversion efficiency in the liquid product.

The present disclosure contemplates catalysts that are fluidizable, e.g., in the form of Group A Geldart particles (see Geldart, D. (1973), "Types of gas fluidization". *Powder technology* 7 (5): 285-292).

The catalyst useful for catalytic pyrolysis of biomass in accordance with the present disclosure comprises:

(i) matrix material comprising a support and/or binder, and (ii) at least one metal oxide on the matrix material, in which the metal oxide comprises metal selected from the group consisting of tungsten, chromium, cobalt, molybdenum, nickel, and combinations thereof.

The catalyst in specific embodiments can have Lewis acid and Brønsted acid sites present on the catalyst at a Lewis to Brønsted infrared band height ratio ($cm^{-1}/cm^{-1}$) in a range of from 0.1 to 50.

In specific embodiments of the catalyst, the Lewis acid and Brønsted acid sites may be present on the catalyst at a Lewis: Brønsted infrared band height ratio ($cm^{-1}/cm^{-1}$) in a range of from 0.5 to 20. In other embodiments, the Lewis acid and Brønsted acid sites may be present on the catalyst at a Lewis: Brønsted infrared band height ratio ($cm^{-1}/cm^{-1}$) in a range of from 0.75 to 5.

In various embodiments of the catalyst, the metal oxide has a loading on the matrix material of from 10 to 20% by weight, based on total weight of the metal oxide and matrix material. In some specific implementations, the metal oxide has a loading on the matrix material of from 12 to 18% by weight, based on total weight of the metal oxide and matrix material. In other specific implementations, the metal oxide has a loading on the matrix material of from 15 to 17% by weight, based on total weight of the metal oxide and matrix material.

The catalyst is advantageously of particulate form, having a size, shape, and composition that accommodates the biomass pyrolysis process that is to be catalytically carried out. In various embodiments, the particulate catalyst may have an average particle size in a range of from 20 to 150 µm. In other embodiments, the particulate catalyst may have an average particle size in a range of from 25 to 125 µm. In still other embodiments, the particulate catalyst may have an average particle size in a range of from 30 to 80 µm.

The catalyst in some embodiments may have an acid site loading, as measured by ammonia adsorption, in a range of from 3 to 10 mL of $NH_3$ per gram of catalyst. In other embodiments, the catalyst may have an acid site loading, as measured by ammonia adsorption, in a range of from 3 to 8 mL of $NH_3$ per gram of catalyst.

Catalyst compositions of the disclosure may have any suitable characteristics of bulk density, surface area, porosity, and attrition resistance. For example, catalysts of the disclosure in specific embodiments may independently have any one or more of the characteristics of: a tap bulk density in a range of from 0.75 to 2.2 gm per $cm^3$ of catalyst; a BET surface area in a range of from 20 to 150 $m^2$/gram; porosity providing a pore volume in a range of from 0.2 to 1.0 $cm^3$ of pore volume per gram of catalyst; and an Attrition Index in a range of from 2 to 25.

In various specific embodiments, the metal oxide in the catalyst comprises tungsten oxide.

The matrix material in the catalyst of the disclosure includes a support and/or binder. The matrix material may include a support, which may be of any suitable composition, and in specific embodiments may comprise material selected from the group consisting of titania, alumina, silica, ceria, zirconia, zeolites, and compatible mixtures, alloys, and composites of two or more of the foregoing. In some embodiments, the catalyst may comprise a non-zeolitic support. In other embodiments, the catalyst may comprise a zirconia support, e.g., of tetragonal phase zirconia; the metal oxide in such embodiments may comprise tungsten oxide.

The matrix material in the catalyst of the present disclosure may additionally or alternatively comprise a binder. The binder may comprise material selected from the group consisting of macroreticulate polymers, alumina, kieselguhr, kaolin, bentonite, clays, and compatible combinations of two or more of the foregoing.

In various embodiments, the catalyst may further comprise a catalytic promoter, e.g., a catalytic promoter that imparts desirable additional functionality such as increasing hydrogen production and/or inhibiting coke formation. The catalytic promoter may be of any suitable type, and may for example comprise a metal selected from the group consisting of platinum, palladium, ruthenium, cobalt, nickel, molybdenum, hafnium, copper, iron, tin, manganese, magnesium, chromium, lanthanum, and compatible combinations of two or more of the foregoing. The promotors may be present in the catalyst at any suitable concentrations, and in various embodiments are present in the catalyst at concentrations of from 1 to 15% by weight, based on the total weight of the catalyst.

Catalysts of the present disclosure, having the properties described herein for such catalysts, will be effective for the catalytic pyrolysis of biomass, irrespective of the specific catalyst preparation method that is employed. A wide variety of preparative techniques and starting materials may be employed, as will be appreciated by those ordinarily skilled in the art, based on the disclosure herein. Illustrative examples of preparation methods that may be usefully employed in the broad practice of the present disclosure include, without limitation, co-precipitation, spray-drying, incipient wetness, and combinations of two or more thereof.

In one illustrative embodiment, the catalyst useful for catalyzing pyrolysis of biomass comprises a zirconia support and tungsten oxide on the zirconia support at a tungsten oxide loading of from 10 to 20% by weight, based on total weight of zirconia and tungsten oxide, such catalyst being of particulate form with an average particle size in a range of from 20 to 150 µm, with an acid site loading, as measured by ammonia adsorption, in a range of from 3 to 10 mL of $NH_3$ per gram of catalyst, and wherein Lewis acid and Brønsted acid sites are present on the catalyst at a Lewis to Brønsted infrared band height ratio ($cm^{-1}/cm^{-1}$) in a range of from 0.1 to 50.

The present disclosure additionally contemplates a process for catalytic pyrolysis of biomass, comprising:

reacting a biomass starting material under pyrolysis conditions in the presence of a catalyst to yield a pyrolysis reaction product; and regenerating the catalyst used in the pyrolysis reaction, to remove coke deposited on the catalyst and yield regenerated catalyst for use in the pyrolysis reaction, in which the catalyst used in such process comprises catalyst of the present disclosure.

The pyrolysis reaction can be carried out with any suitable ratio of catalyst:biomass starting material. For example, the pyrolysis reaction can be carried out at a weight ratio of catalyst to biomass starting material that is in a range of from 1:1 to 100:1.

In the catalytic pyrolysis process, the pyrolysis reaction can be carried out in a reactor of any suitable type, including transport reactors, circulating fluidized-bed reactors, fluidized catalytic cracking (FCC) reactors of types that are utilized in refinery operations for the cracking of petroleum hydrocarbons, etc., at any suitable processing rates and process conditions that are effective to produce acceptable pyrolysis reaction products. As an illustrative example, the pyrolysis reaction can be carried out in a transport or fluidized reactor to which the biomass starting material is introduced at a rate providing a residence time in a range of from 0.25 to 5 seconds.

The pyrolysis process, as indicated, can be carried out at any appropriate pyrolysis conditions. In some embodiments, the pyrolysis conditions comprise temperature in a range of from 200° C. to 700° C. In other embodiments, the pyrolysis conditions comprise temperature in a range of from 200° C. to 550° C. In various embodiments, the pyrolysis conditions comprise pressure in a range of from 1 to 25 bar. In still other specific embodiments, the pyrolysis conditions comprise ambient pressure.

The pyrolysis process may be carried out in any suitable mode of operation that is effective to achieve the catalytic pyrolysis of the biomass material, e.g., in any of batch, semi-batch, or continuous modes of operation.

In various implementations of the pyrolysis process, the pyrolysis reaction and regeneration of the catalyst are carried out continuously with one another.

Regeneration of the catalyst after it has become coked in the pyrolysis reaction can be carried out at any appropriate regeneration conditions that effect at least partial removal of coke from the catalyst and renew the catalyst for use in the pyrolysis reaction. In some embodiments, regeneration of the catalyst is carried out at temperature in a range of from 400° C. to 1000° C. In other embodiments, regeneration of the catalyst is carried out at temperature in a range of from 400° C. to 850° C. In still other embodiments, regeneration of the catalyst is carried out at temperature in a range of from 500° C. to 700° C.

Any appropriate gaseous environment can be utilized for the regeneration of the catalyst. For example, regeneration of the catalyst can be carried out in the presence of oxygen or an oxygen-containing gas. Oxygen-containing gases such as air and/or air diluted in carbon dioxide can be used for such purpose. In various embodiments, regeneration of the catalyst is carried out in the presence of air and/or steam, e.g., dilute air and/or dilute steam, in which the diluent may comprise any suitable diluent gas species, e.g., argon, helium, nitrogen, or carbon dioxide.

The pyrolysis process in various embodiments further comprises recovering a bio-oil from the pyrolysis product.

In a particular embodiment, the recovery of bio-oil comprises:
separating the pyrolysis product to recover (i) a vapor and gas fraction and (ii) a solids fraction comprising pyrolysis product solids, including biomass char, unreacted biomass, and biomass ash, and the catalyst;
cooling the vapor and gas fraction to recover a bio-crude liquid; and
removing water from the bio-crude liquid to produce the bio-oil.

Such recovery may be carried out with the catalyst from the solids fraction being regenerated and thereafter recycled to the pyrolysis reaction. The recovery may be carried out so that the bio-oil produced in the recovery has a desired oxygen content, e.g., an oxygen content in a range of from 1% to 25% of oxygen by weight, based on weight of the bio-oil. In various embodiments, the catalytic pyrolysis process may be carried out to achieve a carbon conversion efficiency in a range of from 20% to 65% by weight, based on weight of the biomass starting material.

The vapor and gas fraction that is produced in the pyrolysis reaction and thereafter separated from the pyrolysis product may be recycled to the pyrolysis reaction. Alternatively, such vapor and gas fraction may be discharged from the process system for further processing or other disposition.

The present disclosure also contemplates a system for catalytic pyrolysis of biomass, comprising a pyrolysis reactor adapted to react biomass starting material under pyrolysis conditions in the presence of catalyst to yield pyrolysis product, and a regenerator adapted to receive coked catalyst from the pyrolysis reactor and to regenerate same for recirculation to the pyrolysis reactor, wherein the pyrolysis reactor is provided with catalyst according to the present disclosure.

In one specific embodiment of such system, the catalyst utilized in the pyrolysis system comprises a tungstated zirconia material that is characterized by: a tungsten loading of 15-17 weight percent, based on total weight of tungsten and zirconia; an acid site loading of greater than 3 mL per gram of ammonia adsorption; and a BET surface area greater than 50 $m^2$ per gram. The tungstated zirconia material in such embodiment is advantageously in a particulate form, having a particle size in a range of from 50 to 100 µm, and an Attrition Index of less than 20.

As used herein, the term "Attrition Index" refers to an attrition parameter that is determined by exposing particulate material in a Davison jet cup to turbulence and then relating the loss of "fines" to attrition, in which the fines generated from a material in the test are compared to the performance of reference material, e.g., a FCC (fluidized catalytic cracking) catalyst, under the same testing conditions.

The testing procedure used to determine Attrition Index in accordance with the present disclosure is similar to the technique that is described in Coco et al., Powder Technology 200, 2010, p. 224 and references identified therein. In such procedure, 5 grams of the powdered catalyst are tested using nitrogen as the high velocity gas that is added tangentially to the jet cup. The nitrogen gas is supplied at a flow rate of 21 standard liters of dry nitrogen per minute (SLPM), with such gas stream being adjusted to 70% relative humidity by water addition. The powdered catalyst is exposed to the humidified nitrogen gas jets for one hour. Prior to testing, the powdered catalyst is analyzed using a HELOS Particle Analyzer to determine the pre-test fraction of fines ("fines" being defined for such purpose as particles having a size of less than 20 µm). After testing, the material from the jet cup is again analyzed to determine the mass of particles having a size of less than 20 µm. The increase in the fractional material in the jet cup having a size of less than 20 µm in addition to the mass of material collected in the system filter is considered to be the generated fines. The Attrition Index is a unitless value that is equal to the weight percent of generated fines, based on the initial weight of powdered catalyst introduced to the jet cup.

Using this procedure for determining Attrition Index, standard FCC catalysts variously exhibit Attrition Indices on the order of 8-15.

Total acid site loadings of catalysts of the present disclosure are readily determined based on ammonia temperature-programmed desorption ($NH_3$-TPD). The ammonia-TPD measurements described herein were performed on an AutoChem 2920 instrument (Micromeritics). A thermal conductivity detector was used for continuous monitoring of the desorbed ammonia. Prior to TPD measurements, samples were pretreated at 200° C. for 1 hour in a flow of ultrapure helium (50 ml $min^{-1}$). After such pretreatment, the sample was cooled to 80° C. under ultrapure helium atmosphere. The sample then was saturated with a gas flow of 10% ultrapure anhydrous ammonia gas (balance He, total flow rate of 75 ml $min^{-1}$) at 80° C. for 2 hours and subsequently flushed with pure helium (flow rate of 60 ml $min^{-1}$) for 1 hour to remove any physisorbed ammonia. The heating rate for the TPD measurements, from 80° C. to 800° C., was 10°

C. min$^{-1}$. In ammonia-TPD analysis, two significant observed parameters are peak desorption temperature ($T_{max}$) and desorbed ammonia volume. The peak desorption temperature is an indirect measure of the strength of acid sites and the desorbed ammonia volume is correlated to the density of acid sites.

Ammonia-TPD has certain limitations in characterizing acidic materials. The nature of the acid site (Brønsted or Lewis) cannot be determined by this technique. A pyridine FT-IR analysis is therefore carried out to understand the nature of catalyst acid sites. Integrated area of the pyridine FT-IR spectrum provides an estimate of the density of each type of acid site (Brønsted or Lewis).

Pyridine FT-IR determinations of catalysts of the present disclosure are carried out using Nicolet Magna 560 FT-IR instrument equipped with MCT-B detector and KBr beam splitter. Spectra are scanned in a 500-4000 cm$^{-1}$ range in diffuse reflectance Infrared Fourier Transform spectroscopy (DRIFTS) mode. Pyridine adsorption measurements described herein were carried out in a DRIFTS cell located inside an IR bench. This cell can be heated and cooled in a controlled manner.

FT-IR experiments described herein were carried out according to the procedure reported by Stevens et al., Applied Catalysis A: General 252, 2003, 57. In such procedure, 25 mg of catalyst were placed into the DRIFTS cell. The catalyst was pretreated in situ by heating the cell to 500° C. at a ramp rate of 10° C./min in 30 ml/min N$_2$ flow and then held for 2 hours. After pretreatment, the reactor was cooled to room temperature in a step-wise manner. FTIR spectra of the clean catalyst surface were recorded at 150° C. and used as a baseline.

Pyridine adsorption was carried out at 150° C. to avoid condensation on the sample (pyridine's boiling point is 116° C.). Pyridine was introduced into the DRIFTS cell by flowing 20 ml/min N$_2$ through a pyridine saturator for 1 hour. Physisorbed pyridine was removed from the surface by flowing 30 ml of N$_2$ through the cell at 150° C. for 30 minutes and an FTIR spectrum was recorded.

Following the pyridine adsorption and characterization, the spectra from the corresponding untreated sample recorded (the baseline) were subtracted from the measured spectra of the sample after pyridine adsorption. All spectra are reported in absorbance mode and resulting spectra were used to observe net changes to the catalyst sample from pyridine adsorption and desorption.

Peaks in the range of 1700-1400 cm$^{-1}$ in the pyridine FT-IR spectra provide valuable information on the nature of the catalyst acid sites. Peaks at 1440 cm$^{-1}$ and 1598 cm$^{-1}$ are associated with Lewis acidity. Peaks at 1639 cm$^{-1}$ and 1541 cm$^{-1}$ are due to ring vibrations of pyridine bound to Brønsted acid sites.

Lewis to Brønsted acid site ratio was determined by comparing corresponding peak heights. Spectral peaks at 1444 cm$^{-1}$ denoted Lewis acid sites and spectral peaks at 1540 cm$^{-1}$ were attributed to Brønsted acid sites. Peak heights were determined using Omnic FT-IR software version 7.1a.

Surface area measurements of catalysts of the present disclosure are specified using BET nitrogen adsorption determinations.

The tungsten oxide loading of the catalyst composition and dispersion of tungsten oxide therein are important variables that impact the activity of the catalyst when tungsten oxide is used as the metal oxide and zirconia is used as a support. Bulk tungsten oxide loadings of 15-17 weight percent on zirconia supports have been found to be highly advantageous. Tungsten oxide loadings significantly below 15 wt. % reduce the number of acid sites on the catalyst to undesirably low levels, and tungsten oxide loadings substantially higher than 17 wt. % are susceptible to forming regions of bulk tungsten oxide, e.g., WO$_3$, in the catalyst that have been found to be inactive for deoxygenation in catalytic pyrolysis processes. A tungsten oxide loading of 15-17 weight percent is consistent with monolayer coverage of tungsten oxide on the zirconia support, and such monolayer coverage affords the highest number of acid sites in the catalyst composition.

Since bulk tungsten oxide in the form of WO$_3$, has been found to be inactive in catalytic fast pyrolysis, it is important to characterize the dispersion of the tungsten oxide in the aforementioned tungstated zirconia catalyst, in addition to the bulk loading of tungsten therein. It is well-established that the tetragonal phase of zirconia is more active than other zirconia phases in catalysis. WO$_3$/ZrO$_2$ catalysts of the present disclosure preferably have tetragonal zirconia phase, to facilitate active site formation and enable better dispersion of WO$_3$ to be achieved. The presence of the tetragonal phase indicative of formation of active solid acid catalyst is readily determined by x-ray diffraction (XRD), as evidenced by a characteristic intense peak at 2θ 30°, and bulk WO$_3$ species can be characterized by diffraction peaks at 2θ values of 23.12°, 23.59°, and 24.38°. Such XRD validation of the catalyst composition can be carried out with a suitable diffractometer, such as for example a Shimazdu Lab X6000 x-ray diffractometer operating in the 2θ range of 5° to 70°.

In the catalytic pyrolysis process, the metal oxide catalyst of the present disclosure enables the production of stable liquid pyrolysis reaction products that are significantly lower in oxygen content than the products of conventional biomass pyrolysis processes, and much more suitable for refining to form liquid hydrocarbon biofuels.

The biomass starting material utilized in such catalytic pyrolysis process can be of any suitable type. Such biomass may for example comprise nonhazardous lignin waste material that is segregated from other waste materials, solid nonhazardous cellulosic material of varying types, lignocellulosic material, and the like. Specific examples include, without limitation: forestry-derived materials, e.g., mill residues, pre-commercial thinnings, slash, brush, and other non-merchantable material; manufacturing and construction wood waste materials (other than pressure-treated, chemically-treated, or painted wood wastes), such as waste pallets, crates, dunnage, scrap lumber, and the like; landscaping and right-of-way tree trimmings; paper that is commonly recycled; agricultural wastes, such as those deriving from orchard tree crops, vineyards, and other food crops, and their respective byproducts and residues; livestock waste nutrients; plants specifically grown for use in the production of liquid fuels or otherwise for production of electricity; and combinations of the foregoing materials.

The biomass starting material in various embodiments can be constituted at least in part by cellulosic and/or lignocellulosic material. Cellulose is a polysaccharide formed of 1,4-linked glucose units and is a primary structural component found in plants. Cellulose is the most abundant organic chemical on earth, with an estimated annual biosphere production of approximately 90×10$^9$ metric tons of such material. Lignin is a three-dimensional amorphous natural polymer containing phenylpropane units that are tri- or tetra-substituted with hydroxyl groups and methoxyl groups. Lignin makes up about one quarter to about one third of the dry mass of wood and generally lacks a defined primary structure. Lignocellulose is primarily a combination of cellulose, lignin, and hemicellulose.

Biomass starting materials useful in the catalytic pyrolysis process of the present disclosure can comprise a wide variety of cellulosics and lignocellulosics. For example, the biomass can be derived from both herbaceous and woody sources. Illustrative, non-limiting examples of herbaceous biomass sources that may be used in the catalytic pyrolysis process of the present disclosure include wood (hardwood and/or softwood), tobacco, corn, corn residues, corncobs, corn husks, sugarcane bagasse, castor oil plant, rapeseed plant, soybean plant, serial straw, grain processing byproducts, bamboo, bamboo pulp, bamboo sawdust, and energy crops such as switchgrass, *miscanthus*, and reed canary grass. "Waste" biomass materials that may be used in specific embodiments of the catalytic pyrolysis process include, without limitation, corn stover, rice straw, paper sludge, and waste papers and pulps (e.g., recycled paper, recycled pulp, bleached paper, bleached pulp, semi-bleached paper, semi-bleached pulp, unbleached paper, and unbleached pulp).

In various specific implementations, the catalytic pyrolysis process of the present disclosure is operated using lignocellulosic biomass materials, e.g., from forest and agricultural energy crops such as switchgrass, *miscanthus*, energy canes, poplar, willow, and the like, to form low oxygen content, stable liquid intermediates that can be subsequently refined to produce liquid hydrocarbon fuels.

The biomass that is employed as the feedstock for the catalytic pyrolysis process of the disclosure can be furnished in any suitable form, and may be prepared for the pyrolysis process by any appropriate preparation methods.

Biomass preparation for pyrolysis can for example comprise size reduction and drying of the biomass. The biomass may be particularized, which may be a natural state of the biomass or may result from processing steps in which a raw biomass material is converted to a particularized form. Preferably, the size of the biomass introduced into the reactor is such that heat transfer rates are sufficiently high to maximize bio-oil production. The cost of any required size reduction and the bio-oil yield resulting from such size reduction may be closely related and may require design and/or empirical efforts to determine the most beneficial size of the biomass to be introduced to the pyrolysis reaction. In some embodiments, biomass particles can have an average size of about 10 mm or less, about 8 mm or less, about 5 mm or less, about 2 mm or less, about 1.5 mm or less, or about 1 mm or less, e.g., with a lower limit of 0.1 mm in any of such ranges. In other specific embodiments, average particle size can be from 0.1 mm to 10 mm, from 0.1 mm to 8 mm, from 0.1 mm to 5 mm, from 0.1 mm to 2 mm, or from 0.1 mm to 1.5 mm.

Biomass employed as feedstock for the catalytic pyrolysis process of the disclosure may in some instances be pyrolyzed in an as-received or raw form, e.g., after appropriate sizing has been completed, when particularization is necessary. In other instances, adjustment of the moisture content of the raw biomass may be desired, in order to achieve a desired process heat balance, and/or other pre-pyrolysis preparative steps may be necessary or desirable. Thus, although "green" biomass may in some instances be used in the pyrolysis process in an as-received or raw form, drying of such feedstock material may be advantageous in achieving high energy efficiency of the pyrolysis process and production of pyrolysis reaction products of the desired character.

As an example, green biomass as harvested may have a moisture content on the order of 50% by weight of the biomass material. Moisture content of the biomass is desirably as low as possible in order to balance the heat requirements in the process. The raw biomass material may correspondingly require substantial drying in order to balance heat requirements of the pyrolysis process. In some instances, the attainment of extremely low moisture content may be cost-prohibitive, and relaxation of moisture criteria may be necessary to achieve a cost-effective pyrolysis process with acceptable energy efficiency and product yield characteristics.

Moisture content of the biomass can be adjusted externally of the process or internally, by integrating a heat source to maintain the biomass introduced to the pyrolysis process at an appropriate moisture content level. In various embodiments, a desired moisture level of the biomass may be maintained by corresponding modulation of a raw biomass drying operation. The moisture level of the feedstock biomass may for example be in a range of from 0.1 to 15% by weight, or a range of from 0.5 to 10% by weight, or a range of from 0.75 to 7% by weight, or a range of from 1 to 5% by weight, based on weight of the dried biomass, in specific embodiments.

It will be appreciated from the foregoing that the type, source and form of the biomass starting material may be widely varied in the broad practice of the present disclosure.

Biomass pyrolysis can form a cocktail of compounds in various phases, and the pyrolysis product can contain in the range of 300 or more compounds. In prior methods of biomass pyrolysis, the starting biomass material typically is heated in the absence of added oxygen to produce a mixture of solid, liquid, and gaseous products whose specific composition depends on pyrolysis temperature and residence time of the biomass in the pyrolysis reactor. When biomass is heated at low temperature and for long times to effect slow pyrolysis, charcoal is the dominant product. Gases may constitute up to 80% by weight of the pyrolysis product when biomass is heated at temperature above 700° C. In known methods of fast pyrolysis or flash pyrolysis, biomass is rapidly heated to temperatures ranging from 400° C. to 650° C. with low residence times, and such methods commonly achieve products that are up to 75% by weight organic liquids, on a dry feed basis.

Although known methods of flash pyrolysis can produce bio-oils from various feedstocks, these oils typically are acidic, chemically and thermally unstable, and require upgrading. The present disclosure provides an improved catalyst and biomass catalytic pyrolysis process that are effective to form reaction products having a lower oxygen content as compared to reaction products of traditional fast pyrolysis processes. The reaction products from known fast pyrolysis processes typically comprise from 35% to 50% by weight oxygen, in the form of oxygenated material such as esters, alcohols, aldehydes, ketones, sugars, and other oxycompounds. The high oxygen content of reaction products from known fast pyrolysis methods can contribute to low stability of reaction products and can complicate conversion of the reaction products into useful fuels, which typically are formed of mixtures of non-oxygenated, aliphatic and aromatic compounds.

Accordingly, the catalytic pyrolysis process of the present disclosure, producing reduced oxygen content reaction products, allows for easier conversion of the reaction products to biofuels and achieves a major advance in the art.

In various embodiments, the catalytic pyrolysis process of the present disclosure produces a bio-oil having an oxygen content in a range of from 0.1 to 30 wt. %, based on weight of the bio-oil. Specific embodiments of the catalytic pyrolysis process may produce product bio-oil having an oxygen content in a range of from 0.1 to 25 wt. %, from 0.1 to 20 wt. %, from 0.1 to 15 wt. %, from 0.1 to 10 wt. %, or from 0.1 to 5 wt. %, based on weight of the bio-oil. In other embodiments, the oxygen content of the bio-oil can be from 1 to 5 wt. %, from 1 to 20 wt. %, from 1 to 15 wt. %, from 1 to 10% wt. %, from 2 to 10 wt. %, or from 5 to 10 wt. %, based on weight of the bio-oil.

The pyrolysis process of the present disclosure is particularly beneficial in producing pyrolysis products that require less additional processing of the type that is used in conventional biomass pyrolysis. For example, in removing oxygen from the reaction products in known pyrolysis methods, catalytic or non-catalytic methods typically are employed that result in production of carbon dioxide or carbon monoxide, which in turn reduces the overall carbon content of the bio-oil that can be converted to a biofuel. The biomass pyrolysis process of the present disclosure reduces the need for such additional oxygen removal treatment.

Carbon conversion efficiency of a biomass pyrolysis process can be described as the amount of carbon in the bio-oil product in comparison to the amount of carbon in the biomass starting material, viz., Carbon Conversion Efficiency=(Mass of carbon in bio-oil/Mass of carbon in input biomass)*100%

This calculation does not include carbon from additional sources that may be used as feed for the generation of power, heat, or hydrogen, in potential process configurations of the present disclosure.

The catalytic pyrolysis process of the present disclosure achieves oxygen removal during the pyrolysis reaction, and reaction products have overall reduced oxygen content. Such catalytic pyrolysis process may exhibit carbon conversion efficiency below that achievable by a fast pyrolysis process, but the resulting bio-oil will have improved properties, including, without limitation, lower oxygen content, lower acidity, improved thermal stability, and lower water content. Such improved properties positively affect downstream processing, and can significantly increase yields of final products from upgrading of the bio-oil.

In various embodiments, the catalytic pyrolysis reaction process of the present disclosure exhibits a carbon conversion efficiency of the pyrolysis reaction that is greater than 20%, greater than 30%, greater than 40%, greater than 50%, greater than 60%, or greater than 70%. For example, the catalytic pyrolysis reaction process may have a carbon conversion efficiency that is in a range of from 20 to 80%, or more. In specific embodiments, the carbon conversion efficiency of the catalytic pyrolysis process may be in a range of from 30 to 80%, from 35 to 75%, from 40 to 70%, from 50 to 90%, or in other suitable range of values.

The catalytic pyrolysis process of the present disclosure can be carried out in various embodiments by reacting the biomass starting material under pyrolysis conditions in the presence of a catalyst of the present disclosure, to form a stream comprising (i) a pyrolysis product fraction and (ii) a catalyst/biomass solids/reaction product solids fraction. The pyrolysis product fraction (or a further fraction thereof) can have an oxygen content that is below a specified amount, as described herein. This is a particularly beneficial aspect of the pyrolysis reaction, since the low oxygen content of the product increases the usefulness of the pyrolysis reaction product (after water removal) as bio-oil, i.e., a greater proportion of the reaction product is in a form that is useful as a bio-oil.

Referring now to the drawings, FIG. 1 is a block diagram of a catalytic biomass pyrolysis process system according to one embodiment of the present disclosure. As illustrated, a biomass preparation unit can be provided for preparing raw biomass for the pyrolysis process, including size reduction and drying of the raw biomass to predetermined suitable specifications. The prepared biomass is delivered to a catalytic biomass pyrolysis unit in which the pyrolysis reaction is conducted.

Pyrolysis products of the reaction are delivered to a solid/vapor separation unit. Vapor, as well as liquid fractions that may be present, pass from the separation unit to a vapor condensation/liquid collection unit, and solids, including catalyst and solid biomass fractions, pass from the separation unit to a catalyst regeneration unit. In the catalyst regeneration unit, biomass solids, e.g., ash, can be withdrawn, and regenerated catalyst then is reintroduced into the catalytic biomass pyrolysis unit. In the vapor condensation/liquid collection unit, liquid bio-crude is formed and passes to a liquid separator for separation of the bio-oil product from water and other components. Optionally, a tail gas can be withdrawn from the vapor condensation/liquid collection unit. Such tail gas can be recycled within the process system to the catalytic biomass pyrolysis unit, or discharged for further processing or other disposition.

Any suitable type of reactor useful for carrying out fast pyrolysis reactions can be employed in the broad practice of the present disclosure. Ideally, the reactor is specially adapted to the use of catalyst compositions as variously described herein. Illustrative examples of reactors that may be employed in the broad practice of the present disclosure include, without limitation, bubbling fluidized bed reactors, circulating fluidized bed/transport reactors, fluidized catalytic cracking (FCC) reactors of types that are utilized in refinery operations for the cracking of petroleum hydrocarbons, rotating cone pyrolyzers, ablative pyrolyzers, vacuum pyrolysis reactors, and auger reactors.

Figure 2:
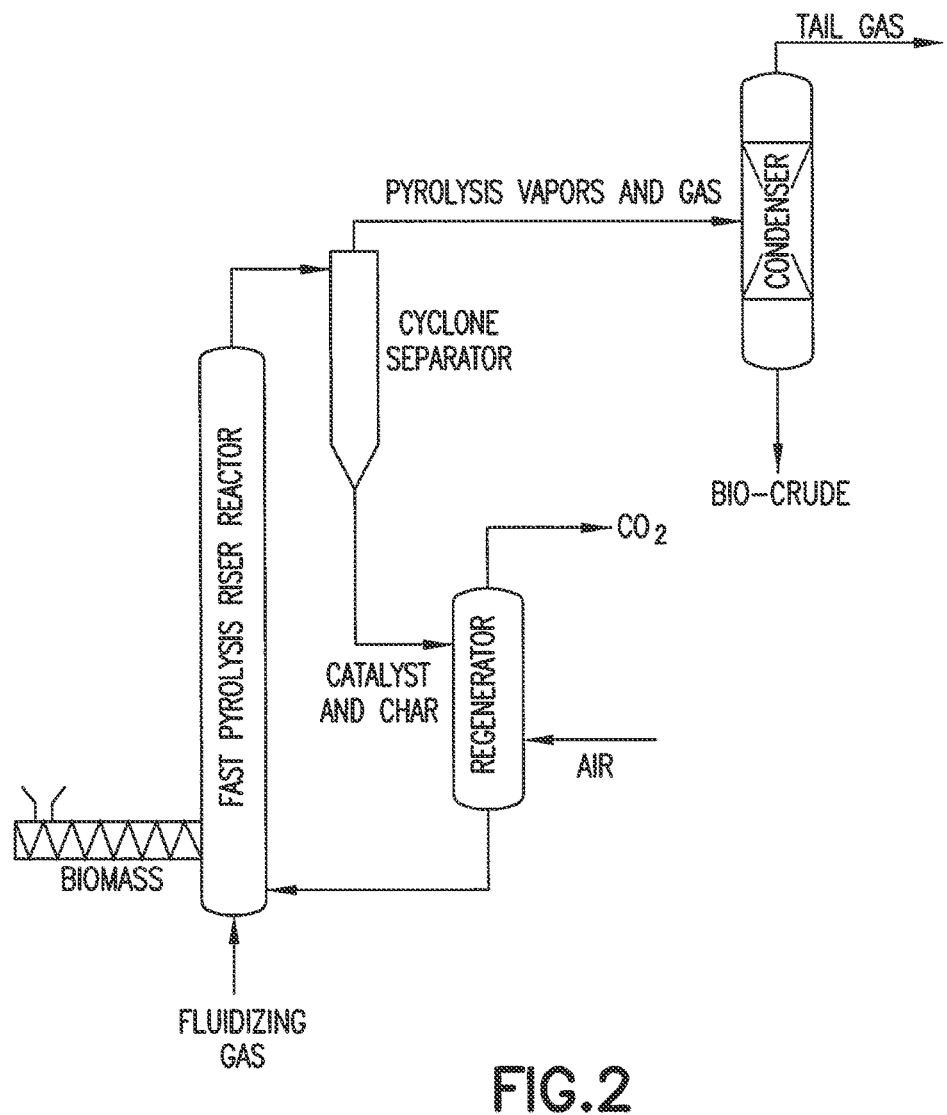
FIG. 2 is a schematic representation of a transport reactor system, similar to circulating fluid bed reactor systems utilized in conventional petroleum refining operations, in which catalyst of the present disclosure may be employed to carry out catalytic biomass pyrolysis.

FIG. 2 is a schematic representation of a transport reactor system in which the catalyst of the present disclosure can be employed to carry out catalytic biomass pyrolysis.

In the transport reactor system, prepared biomass is delivered to the fast pyrolysis reactor with a carrier gas. The biomass enters a mixing zone from which it is transported through a riser section, i.e., a riser reactor. The carrier gas may be of any suitable type, and may for example comprise nitrogen gas or other inert gas. The carrier gas is provided at sufficient rate relative to the reactor volume so that the biomass has a residence time in the riser section of appropriate duration. In specific embodiments, the residence time of the biomass in the riser section may be about 5 seconds or less, about 4 seconds or less, about 3 seconds or less, about 2 seconds or less, or about one second or less, e.g., with a lower limit of 0.1 second in any of such residence time ranges.

The biomass entering the riser reactor comes in contact with the catalyst under appropriate pyrolysis conditions, e.g., temperature, residence time, and catalyst to biomass ratio. In specific embodiments, the pyrolysis temperature can be in a range of from 200° C. to 900° C., from 200° C. to 700° C., from 200° C. to 600° C., from 200° C. to 550° C., from 250° C. to 500° C., or from 300° C. to 500° C. In other embodiments, lower temperature ranges may be beneficial to minimize undesirable thermal effects such as cracking. In still other embodiments, reacting of the biomass in the presence of catalyst can be carried out at a temperature of 600° C. or less, 550° C. or less, or 500° C. or less, or temperature in other suitable ranges. Residence time in specific embodiments may be from 0.5 second to about 5 seconds, from 0.5 second to 4 seconds, from 0.5 second to 3 seconds, or from 0.5 second to 2 seconds, or other suitable residence time ranges.

Pressure of the pyrolysis reaction can be at any suitable value or level. In some embodiments, pyrolysis is carried out at ambient pressure. In other embodiments, pyrolysis is carried out at elevated pressure, such as from ambient pressure to 25 bar (2.5 MPa), from ambient pressure to 20 bar (2 MPa), or from ambient pressure to 10 bar (1 MPa). In still other embodiments, pyrolysis may be carried out at pressure from ambient up to 35 bar (3.5 MPa).

In general, the pyrolysis conditions are utilized for the specific catalyst composition employed in the catalytic pyrolysis process to achieve residence times and heat transfer rates appropriate to maximize liquid bio-oil yield while maintaining high catalyst activity by continuous regeneration. Although batch-wise or intermittent regeneration of the catalyst is contemplated within the broad scope of the present disclosure, continuous regeneration is generally more desirable to maintain appropriate catalyst activity.

The catalytic compositions of the present disclosure exhibit sufficiently high activity to enable low temperature pyrolysis and concurrent low thermal cracking of reaction products of the pyrolysis.

The catalyst is regenerated in the regenerator. The regenerator can be of any suitable type, and can for example comprise a bubbling fluidized bed, fluidized by air and/or steam, e.g., diluted air and/or diluted steam, in which the diluent comprises Ar, He, $N_2$, Xe, Ne, or $CO_2$, or other fluidization medium. The fluidizing medium is injected into the regenerator to fluidize the catalyst bed.

In the fluidized catalyst bed, the catalyst is regenerated by oxidation of char and surface carbon (coke) on the catalyst. The exothermic carbon oxidation can also impart heat to the catalyst solids, to facilitate the endothermic biomass pyrolysis reactions when the catalyst is circulated back to the mixing zone. The catalytic oxidation process may be carried out so that no additional fuel is required to drive the process, i.e., wherein all heat required for catalytic biomass pyrolysis can be obtained from char and coke oxidation, if desired.

In some embodiments, excess heat may be produced by the oxidation of char and coke, beyond the heat requirements of the pyrolysis reactor. Such excess heat may be extracted by heat transfer arrangements of varied types, and utilized for power generation, heat recovery, or other disposition or application.

In other embodiments, heat produced by oxidation of char and coke in the catalyst regeneration may be less than that required for the catalytic oxidation process, and supplemental heat input to the catalytic pyrolysis reactor may be necessary.

The catalyst regeneration operation therefore can be operated in various modes of thermal management for the overall process system.

Catalytic pyrolysis using the catalyst compositions of the present disclosure provides highly selective depolymerization and fragmentation of cellulose, hemicellulose, and lignin components of biomass at low temperature. Such selectivity and low temperature facilitate high bio-oil yield of the pyrolysis reaction. Catalyst compositions of the present disclosure are effective to remove oxygen during biomass pyrolysis and inhibit char formation by effecting scission of specific bonds in cellulose, hemicellulose, and lignin, while promoting hydrocarbon condensation reactions.

The amount of catalyst material circulated through the catalytic biomass pyrolysis process is appropriately based on the biomass throughput of the system, with the amount of solid catalyst being such as to provide the desired heat of reaction for the endothermic pyrolysis reaction and to catalytically control vapor-phase chemistry. The ratio of catalyst to biomass may be at any suitable value. In specific embodiments, such ratio may be in a range of from about 1:1 to about 100:1, based on weight. In other embodiments, the ratio of catalyst to biomass throughput can be from 5:1 to about 75:1, or from about 10:1 to about 50:1, or in other suitable range of ratio values.

In the FIG. 2 pyrolysis system, the stream exiting the pyrolysis reactor, comprising circulating solids, vapors, and gases, is transferred to a cyclone separator that is used to separate the solids, e.g., spent catalyst and char, from the vapors and gases. After separation, the solids exiting the separator collect in the standpipe and flow into the regenerator reactor. Air and/or steam, or other regeneration medium, is introduced to the regenerator to oxidize biomass char and coke that has deposited on the catalyst surface. The principal products of the regenerator reactor are carbon dioxide and heat imparted to the regenerated catalyst. The carbon dioxide can be collected and removed from the system for sequestration or other disposition.

The hot catalyst leaving the regenerator reactor is returned to the pyrolysis reactor.

The pyrolysis vapors and gases that were separated from the solids fraction in the cyclone separator are transferred to the condenser where vapors are condensed into a liquid that typically contains an aqueous phase and an organic phase. In lieu of the cyclone separator, other separation apparatus may be employed to remove particles from the vapor stream, including, without limitation, filters, bag houses, electrostatic precipitators, and the like.

In the condenser, the condensed aqueous phase can be predominantly water, e.g., from about 40-95% water, with water-soluble organic materials such as acids, e.g., acetic acid, phenols, and unconverted anhydrous sugars. The condensed organic phase is denser than the water-rich aqueous phase and typically has a much lower oxygen content. The two phases are physically separated and the hydrocarbon-rich bio-oil is collected at the outlet.

Tail gas such as carbon monoxide is discharged from the condenser as an overhead stream, and may be separately processed or otherwise utilized in the process system as a heating fuel source for the regenerator and/or pyrolysis reactor, if and to the extent desired.

It will be recognized that the process systems depicted in FIGS. 1 and 2 are of an illustrative character only, and that any other suitable pyrolysis system arrangements may be employed, within the scope of the present disclosure.

More generally, the catalytic biomass pyrolysis process of the present disclosure involves reacting a biomass starting material under pyrolysis conditions in the presence of a catalyst of the present disclosure, to form a bio-crude that can be readily processed to form a bio-oil. The bio-oil may have an oxygen content, and may be present in a vapor and/or gas phase, and may be condensed as a liquid phase after the pyrolysis reaction. The catalyst is advantageously separated from the reaction product, and such separation may further include separating any solid component of the reaction product. Thus, the method of forming a bio-oil may comprise separating from the reaction product any materials that are not liquid at ambient conditions. The method may also comprise regenerating the catalyst and recycling the catalyst back to the catalytic biomass pyrolysis reaction. The method may also comprise separating from the reaction product any material that is a gas at ambient conditions.

The present disclosure contemplates the production of a bio-oil that may be variously integrated in petroleum refining systems for the production of products, including blending of the bio-oil with other streams being processed in the refinery, as well as stand-alone upgrading of the bio-oil in the refining system, as well as direct use as a refinery feedstock. In blending applications, the bio-oil product may be blended at any ratio with petroleum crude or other refinery feedstock materials, and processed for production of ultimate products, or intermediates therefor. Similarly, it is contemplated that the bio-oil product of the biomass catalytic pyrolysis process may be blended into refinery process streams at any one or more of multiple insertion points throughout the refinery so as to encompass, or alternatively to bypass, specific unit operations of the refinery. Further, it is contemplated that the bio-oil produced in the catalytic pyrolysis process may undergo upgrading in a stand-alone unit operation using standard refinery equipment to produce either a finished product or a product that is capable of being integrated in a current refinery operation and infrastructure.

The advantages and features of the disclosure are further illustrated with reference to the following examples, which are not to be construed as in any way limiting the scope of the disclosure but rather as being illustrative of embodiments of the disclosure in specific aspects thereof.

In the ensuing examples, the RTI-A9 tungstated zirconia ($WO_3/ZrO_2$) catalyst is a particulate catalyst that is characterized by a tungsten loading of 15-17 weight percent, based on total weight of tungsten and zirconia, an acid site loading of greater than 3 mL per gram of ammonia adsorption, a BET surface area greater than 50 $m^2$ per gram, and a particle size in a range of from 50 to 100 μm.

For such examples, sample pellets were made using a Carver die-press. In a typical procedure, a 1 inch die was filled with catalyst powder and pressed at 30,000 to 60,000 pounds pressure for one minute. The resulting formed pellet was removed from the die and ground to coarse powder using a mortar and pestle. The material yielded by such processing was sieved to collect a 75-90 μm particle sized powder.

Example I (Calcination Temperature)

Tungstated zirconia catalyst precursor samples were calcined at different temperatures (600° C.=Sample RTI-A9-6; 700° C.=Sample RTI-A9; and 800° C.=Sample RTI-A9-7) to determine the effect of calcination temperature on structural properties and acidic nature of the catalyst. X-ray diffraction patterns of the samples calcined at the different temperatures are shown in FIG. 3.

Figure 3:
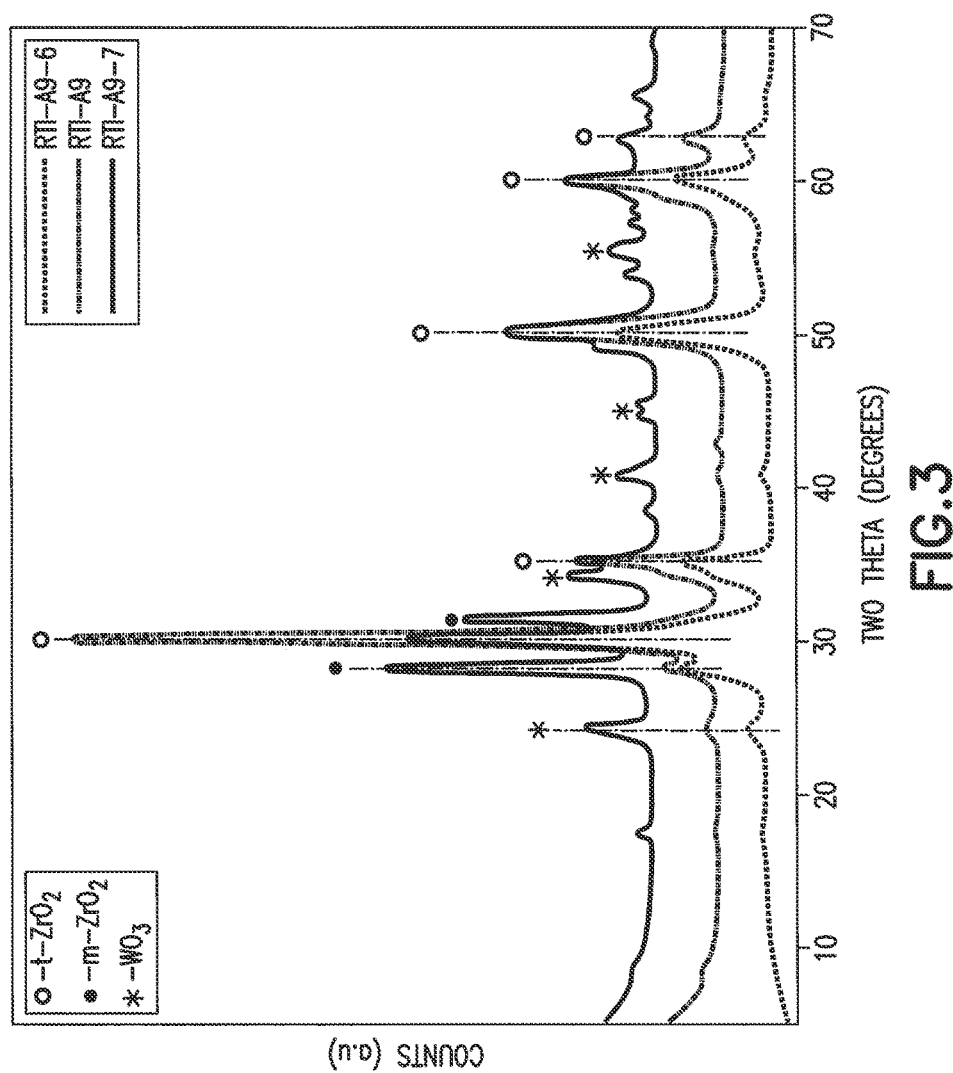
FIG. 3 is a graph of x-ray diffraction (XRD) patterns for tungstated zirconia catalyst precursor samples calcined at 600° C. (Sample RTI-A9-6), 700° C. (Sample RTI-A9), and 800° C. (Sample RTI-A9-7).

As shown in FIG. 3, the intensity of tetragonal zirconia peaks decreased and peaks associated with the monoclinic phase increased with increasing temperature. Monoclinic zirconia can be characterized by distinct diffraction peaks at 2θ values of 28.2° and 31.5°. At higher calcination temperature of 800° C., peaks corresponding to bulk $WO_3$ were also observed. Crystallization of $WO_3$ accelerates at higher temperatures and formation of bulk $WO_3$ was attributable to phase change of both dispersed $WO_3$ species and the $ZrO_2$ support altering the acid strength distribution and acid site density, as confirmed in subsequent ammonia TPD and bench scale pyrolysis results. Even at 800° C. calcination, however, no solid solutions between zirconium and tungsten were observed.

Figure 4:
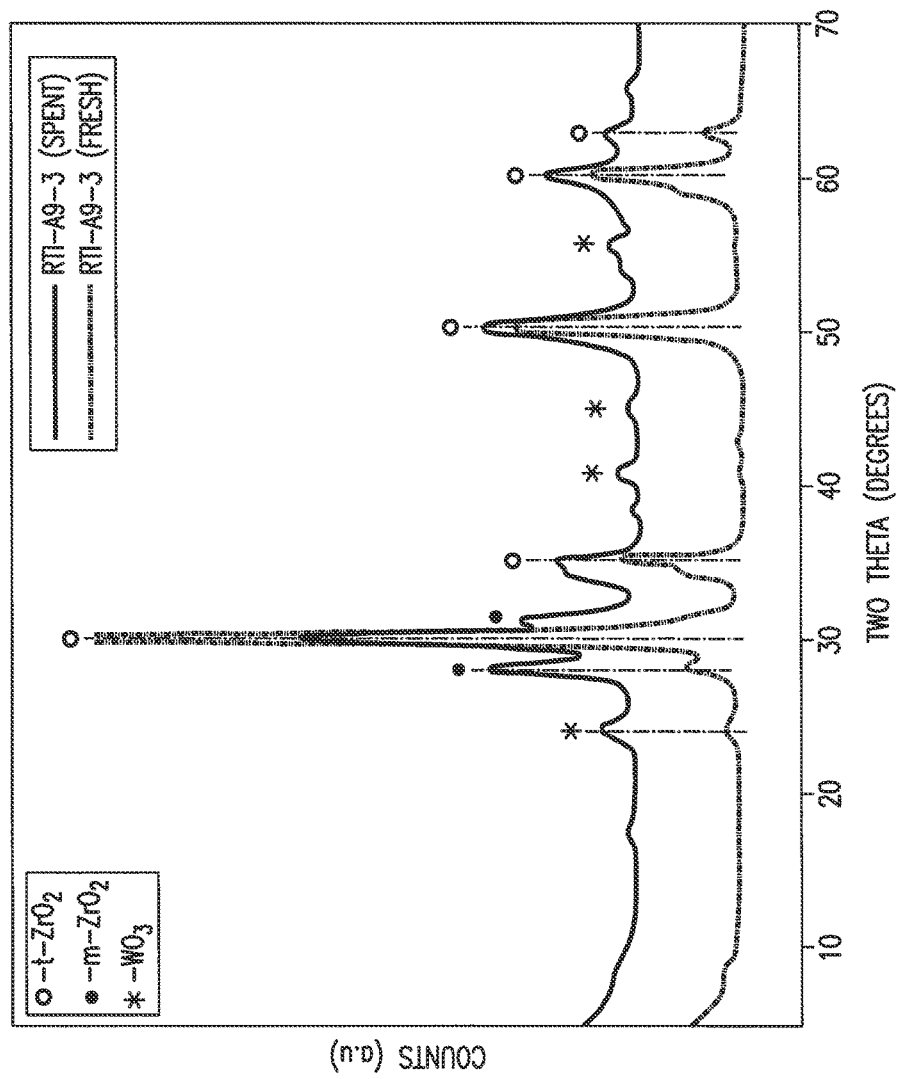
FIG. 4 is a graph of XRD patterns for fresh (Sample RTI-A9-3 (fresh)) and spent (Sample RTI-A9-3 (spent)) tungstated zirconia catalyst.

XRD patterns of fresh (Sample RTI-A-9-3 (fresh)) and spent (Sample RTI-A9-3 (spent)) tungstated zirconia catalyst are shown in FIG. 4. The catalyst material in this comparison was an extrudate form of the tungstated zirconia catalyst, which was crushed for the testing. The spent catalyst sample had been used in a biomass pyrolysis reactor and regenerated (by oxidation to remove coke) several times. The fresh catalyst sample showed only tetragonal zirconia peaks with some contribution from the monoclinic phase. No distinct peaks for bulk $WO_3$ were observed in the fresh catalyst, but well resolved $WO_3$ and monoclinic $ZrO_2$ peaks were observed in the XRD pattern of spent catalyst. Such tungstate/zirconia peaks could be attributed to $WO_3$ phase change, possibly involving conversion of surface monomeric $WO_3$ species into polymeric $WO_3$ species.

Additionally, a small part of more active metastable tetragonal $ZrO_2$ phase was converted into the less active, but stable, monoclinic phase. As a result, the spent catalyst had weaker acid strength and lower acid site density as compared to the fresh catalyst. During these transformations, the catalyst might have achieved its steady-state activity by losing some initial activity, a common occurrence for most heterogeneous catalysts. This observation is supported by bench scale pyrolysis experiments, in which the catalyst showed consistent deoxygenation activity even after 15 reaction-regeneration cycles. No further catalyst deactivation was observed with time, since there was no change in gas and liquid composition.

Example II (Acid Site Density and Distribution)

Tests were conducted to confirm that the active feature of the tungstated zirconia catalyst is the acid sites that are present in the material. Temperature-programmed desorption (TPD) testing was carried out by ammonia-TPD analysis to evaluate acidic centers of the catalyst material. In such analysis, two principal parameters are peak desorption temperature ($T_{max}$) and desorbed ammonia volume. The peak desorption temperature is an indirect measure of the strength of acid sites, and the desorbed ammonia volume is correlated to the density of acid sites in the material.

The ammonia-TPD measurements were performed on an AutoChem 2920 instrument (Micromeritics). A thermal conductivity detector was used for continuous monitoring of the desorbed ammonia and the areas under the peaks were integrated. Prior to TPD measurements, the sample (Sample RTI-A9, the same tungstated zirconia catalyst as tested in Example I) was pretreated at 200° C. for 1 hour in a flow of ultrapure helium (50 mL/minute). After pretreatment, the sample was saturated with 10% ultrapure anhydrous ammonia gas (balance He, 75 mL/minute total flowrate) at 80° C. for 2 hours and subsequently flushed with helium (60 mL/minute) for 1 hour to remove the physisorbed ammonia. The heating rate for the TPD measurements, from 80° C. to 800° C., was 10° C./minute. Acid site density is typically reported as standard condition volume of ammonia desorbed per gram of catalyst. The tungstated zirconia catalyst desorbed 4 mL/gram of ammonia.

Figure 5:
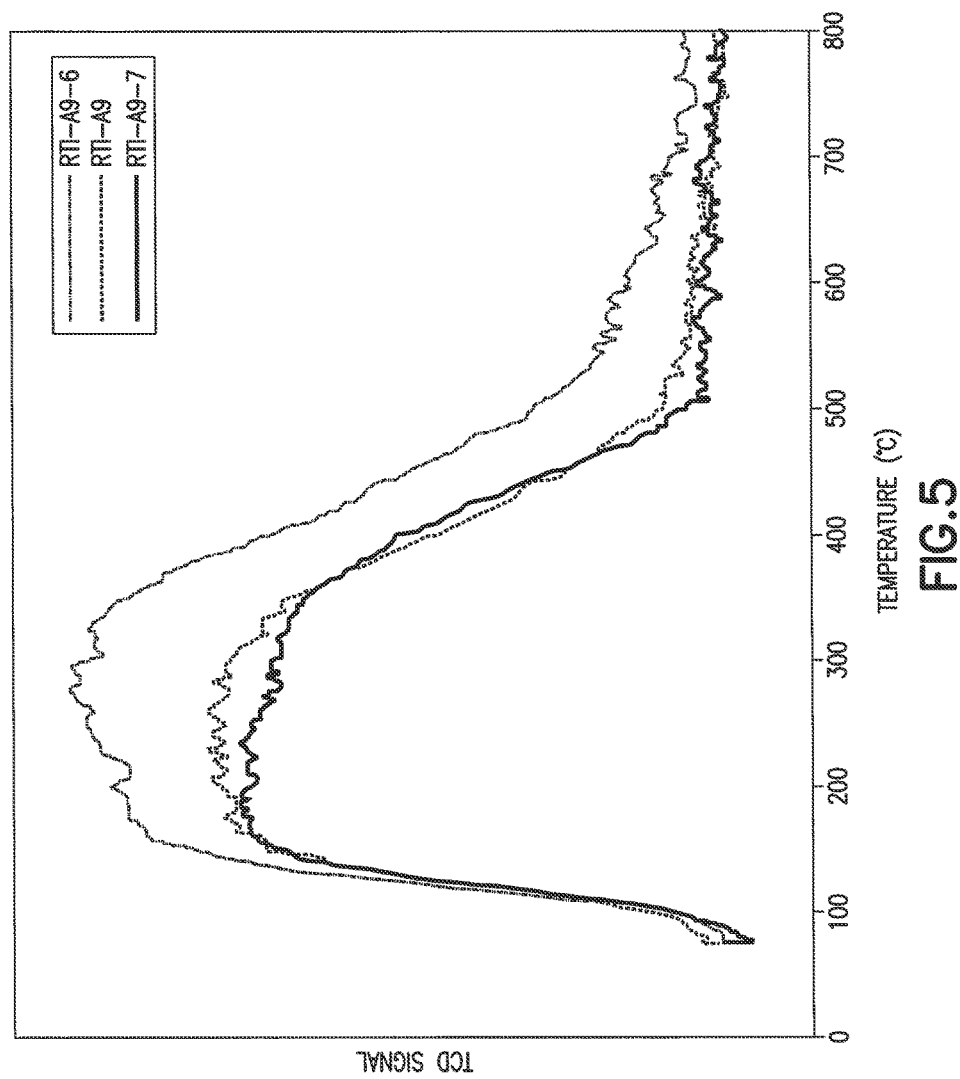
FIG. 5 is a graph of ammonia temperature programmed desorption (TPD) profiles for the tungstated zirconia catalyst samples identified in FIG. 3 (Sample RTI-A9-6, Sample RTI-A9, and Sample RTI-A9-7).

Ammonia TPD profiles of the tungstated zirconia catalyst samples from Example I (Sample RTI-A9-6, Sample RTI-A9, and Sample RTI-A9-7) are shown in FIG. 5. As shown, the desorption maximum is shifted to lower temperature with increasing calcination temperature, suggesting that the acid strength decreases as calcination temperature increases.

Additionally, the acid site density and the number of stronger acid sites decreased with increasing calcination temperature. The catalyst calcined at 600° C. had higher acid site density and a greater number of stronger acid sites than the catalyst calcined at higher temperatures.

Figure 6:
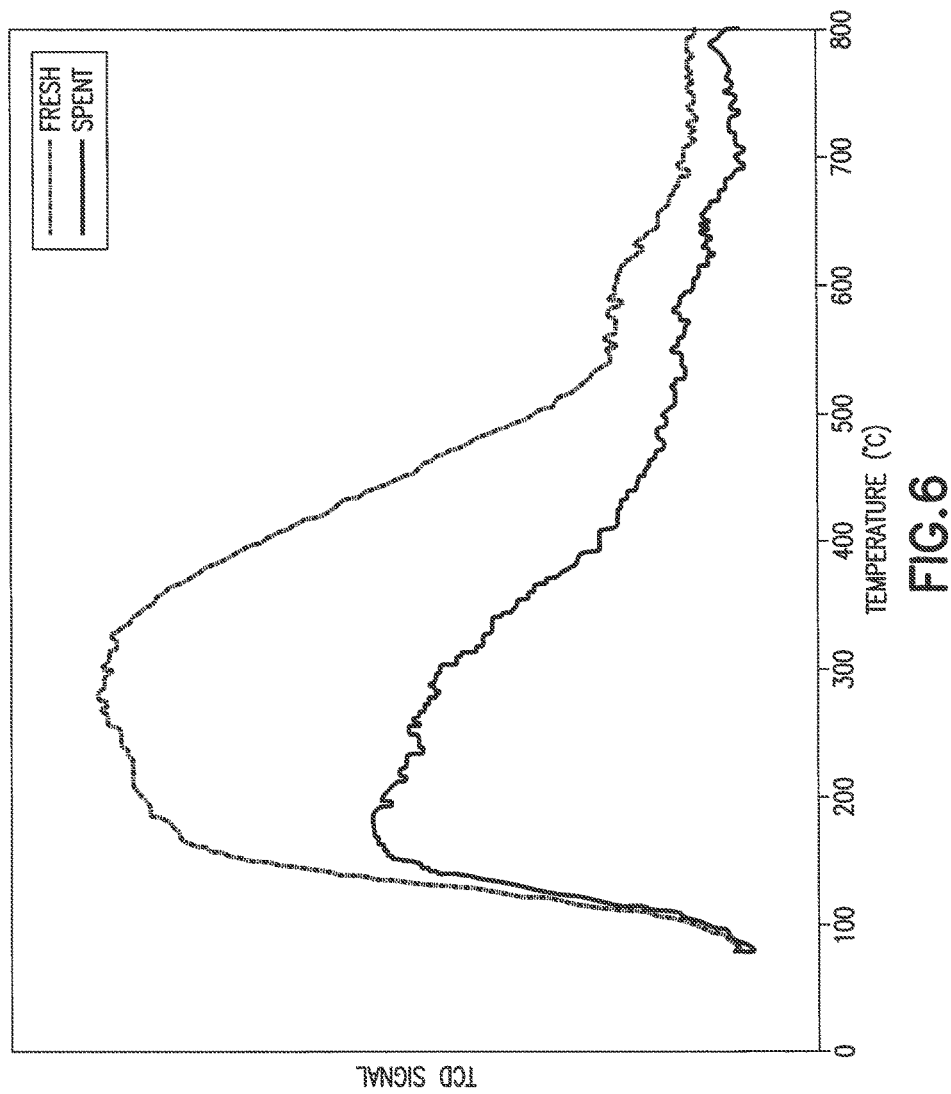
FIG. 6 is a graph of ammonia TPD profiles for fresh ("Fresh") Sample RTI-A9-3 and spent ("Spent") Sample RTI-A9-3 tungstated zirconia catalyst.

FIG. 6 is a graph of ammonia TPD profiles for fresh ("Fresh") Sample RTI-A9-3 and spent ("Spent") Sample RTI-A9-3 tungstated zirconia catalyst.

Acid sites in the fresh RTI-A9-3 catalyst were found to be distributed over a broad temperature range (150-500° C.) with a maximum around 300° C., indicating presence of both weak and stronger acid sites. As shown in FIG. 6, the temperature maximums shifted to lower temperature (around 180° C.) and spent catalyst, signifying a decrease in total acid strength. Comparing the area under the desorption curves of the fresh and spent catalysts in the temperature range of 250-500° C. indicates a significant decrease in the number of stronger acid sites in the spent catalyst. In addition, the total amount of desorbed ammonia decreased for the spent catalyst almost 50%. The total amount of desorbed ammonia for the fresh and spent catalysts was 6.6 mL/g and 3 mL/g, respectively.

The drop in the amount of desorbed ammonia indicated a lower acid site density on the spent catalyst. The decrease in acid strength and acid site density in the spent catalyst could be attributed to $WO_3$ phase change, consistent with XRD measurements from which bulk $WO_3$ peaks were observed in the XRD profile of the spent RTI-A9 catalyst (FIG. 4). In bench-scale catalytic pyrolysis experiments, the fresh catalyst produced more coke, as compared to the less acidic steady-state catalyst. Production of excess coke could be attributed to stronger acid strength of fresh catalyst.

For all versions of RTI-A9, the bulk of the desorption occurs between 150° C. and 350° C. As a basis of comparison, ZSM-5 catalyst typically exhibits strong desorption in this temperature range as well as at temperatures above about 400° C. The RTI-A9 catalyst lacks the strongest acid sites that are present in the ZSM-5 catalyst.

Example III (Pyridine FT-IR Analysis)

Ammonia-TPD has certain limitations in characterizing acidic materials. The nature of the acid site (Brønsted or Lewis) cannot be determined by such technique. A pyridine FT-IR analysis therefore was carried out to investigate the nature of the catalyst acid sites. Integrated area in the pyridine FTIR IR spectrum can provide an estimate of the density of each type of acid site (Brønsted or Lewis).

Pyridine FT-IR analysis was carried out using a Nicolet Magna 560 FT-IR instrument equipped with an MCT-B detector and KBr beam splitter. Spectra were scanned in a 500-4000 $cm^{-1}$ range in diffuse reflectance Fourier transform infrared spectroscopy (DRIFTS) mode. Pyridine adsorption measurements were carried out in a DRIFTS cell located inside the IR bench. The cell was arranged to be heated and cooled in a controlled manner. FT-IR experiments were carried out according the procedure reported in Stevens et al., Applied Catalysis A: General 252, 2003, 57.

25 mg of catalyst were placed into the DRIFTS cell. The catalyst was pretreated in-situ by heating the cell to 500° C. at a ramp rate of 10° C./minute in 30 mL/minute nitrogen flow and then held for 2 hours. After such pretreatment, the reactor was cooled to room temperature in a step-wise manner. FTIR spectra of the clean catalyst surface were recorded at 500, 400, 300, 200, and 150° C. The spectrum recorded at 150° C. was used as a baseline.

Pyridine adsorption was carried out at 150° C. to avoid condensation on the sample (pyridine boils at 116° C. at 1 atm). Pyridine was introduced into the DRIFTS cell by flowing 20 mL/minute nitrogen through a pyridine saturator for one hour. Physisorbed pyridine was removed from the surface by flowing 30 mL of nitrogen through the cell at 150° C. for 30 minutes, and an FTIR spectrum was recorded.

Following the pyridine adsorption and characterization at 150° C., the reactor was heated stepwise to 200, 300, 400 and 500° C. at 10° C./minute ramp rate. Catalytic biomass pyrolysis is typically performed at 500° C., so this temperature was chosen as the maximum temperature for acid strength studies. FTIR spectra were recorded at each of these temperatures, and the spectra from the corresponding untreated sample recorded at the same temperature were subtracted. All spectra were reported in absorbance mode and resulting spectra were used to observe that changes to the sample during pyridine adsorption and desorption.

Figure 7:
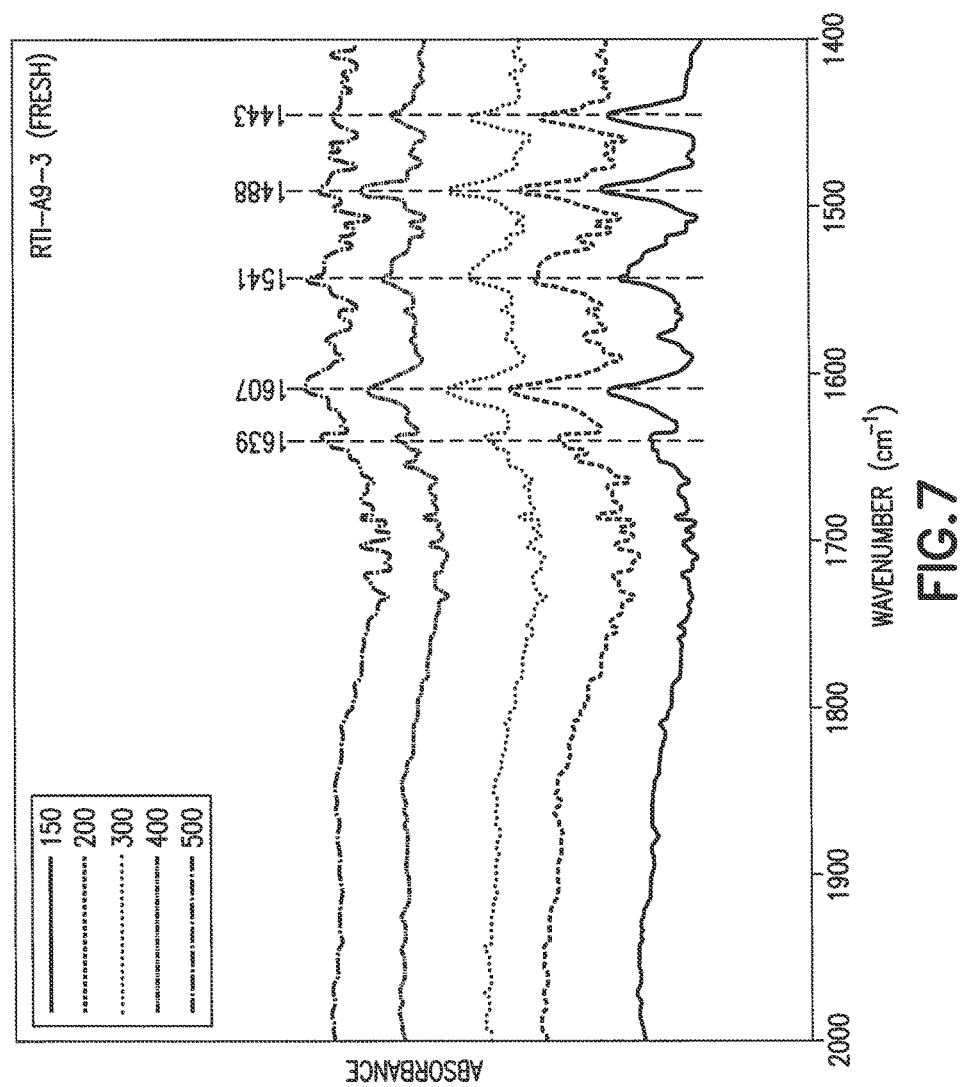
FIG. 7 shows pyridine FT-IR spectra for fresh tungstated zirconia catalyst (Sample RTI-A9-3) as a function of desorption temperature in ° C.
Figure 8:
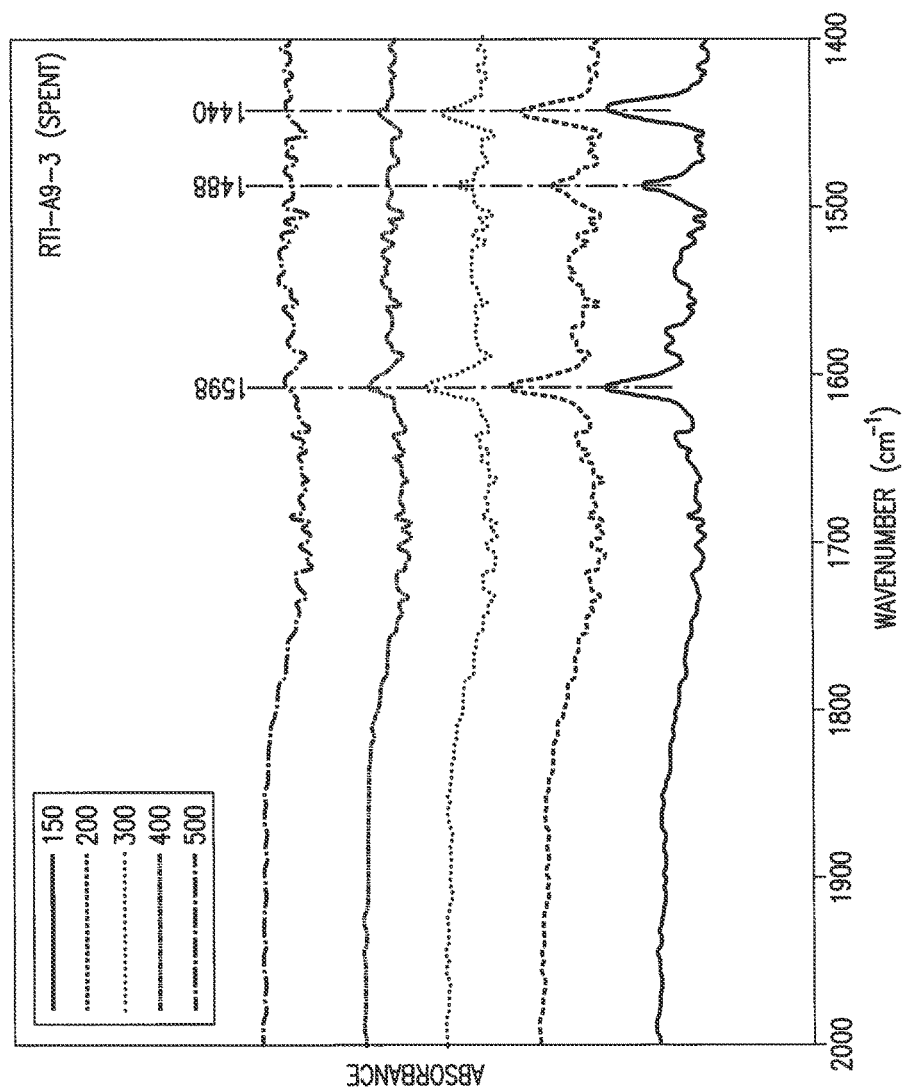
FIG. 8 shows pyridine FTIR spectra for spent tungstated zirconia catalyst (Sample RTI-A9-3) as a function of desorption temperature in ° C.

Pyridine FT-IR spectra of fresh and spent RTI-A9-3 catalysts are shown in FIGS. 7 and 8, respectively. The peaks in the range 1700-1400 $cm^{-1}$ in the pyridine FT-IR spectra provide information on the nature of the catalyst acid sites. Significant differences in the absorption bands can be observed in this region between the fresh and spent catalysts. Peaks at 1440 $cm^{-1}$ and 1598 $cm^{-1}$ are associated with Lewis acidity, while peaks at 1639 $cm^{-1}$ and 1541 $cm^{-1}$ are due to ring vibrations of pyridine bound to Brønsted acid sites. The peak at 1488 $cm^{-1}$ is not attributable to either Brønsted or Lewis sites. From the pyridine FT-IR experiments, it was confirmed that fresh RTI-A9-3 catalysts possess both Brønsted and Lewis acid sites. Additionally, while use of the catalyst results in reduction of total acid sites on the catalyst, the Lewis to Brønsted acid site band height remains close to 1 after multiple reaction/regeneration cycles.

The intensity of the Lewis acid peaks decrease with increasing desorption temperature and begin to diminish at or above about 300° C. The Brønsted acid peaks persist even at 500° C. desorption. This suggests that the Brønsted acid sites have higher acid strength compared to the Lewis acid sites. The pyridine FT-IR results are consistent with the ammonia-TPD results confirming the decrease in acid strength for the spent catalysts. Low coke formation over steady-state catalyst could be attributed to moderately strong Lewis acid sites.

The specific individual concentrations of Lewis and Brønsted acid sites were not quantitatively determined, but a relative comparison was made by comparing the height of the peaks for each type of site. For such purpose, the absorption band near 1440 $cm^{-1}$ is used for Lewis acid sites and the band at 1540 $cm^{-1}$ is used for the Brønsted acid sites, as the technique used to parameterize catalyst of the present disclosure. The RTI-A9 catalyst exhibited a Lewis to Brønsted acid site band height ratio of 1.1. In contrast, ZSM-5 catalyst is reported in the literature to exhibit a Lewis to Brønsted acid site band height ratio greater than 10. While we do not wish to be bound by any theory or hypothesis as regards the efficacy of the catalysts of the present disclosure in catalytic pyrolysis of biomass, it may be that Lewis acid sites enhance adsorption of oxygenated molecules and that specific relative distributions of Lewis acid and Brønsted acid sites in the catalyst achieve an appropriate balance of activity of the catalyst with the susceptibility to coke formation so that high yields of liquid product yield are facilitated.

Example IV (Surface Area and Porosity of the Catalyst)

The catalyst surface area and porosity are important parameters related to catalytic activity of tungstated zirconia catalyst. A catalyst with lower surface area may have a lower acid site density since active material is not exposed at the surface. In addition, lower surface area catalyst with high acid site density may be more susceptible to deactivation by coking, since coking on one active site may hinder nearby sites on the catalyst.

The surface area of the RTI-A9 catalyst was measured by nitrogen adsorption technique and calculated based on the BET method, yielding a surface area of 78 $m^2/g$. Good activity was observed on materials having surface areas greater than 50 $m^2/g$.

High surface area of catalysts is possible due to porosity of individual catalyst particles. Pores running through the particle expose more of the catalyst material to reactants. Catalyst materials such as ZSM-5 catalyst have high porosity comprising pores of about 0.6 nm size. Such small pores are on the same dimensional scale as reactant molecules and the ability of larger pyrolysis products to reach the active site can be limited. Pores in the tungstated zirconia RTI-A9 catalyst are typically greater than 10 nm in size and do not create any steric hindrance of molecules reaching active sites.

Example V (Particle Size and Attrition)

Several characteristics are important to fluidization of catalysts. Catalyst particles with diameters between 50-100 μm are typical of fluidized and transport reactor applications. Tungstated zirconia catalyst with particles in this range has shown good fluidization behavior.

In fluidization applications, attrition resistance is an important characteristic, since it is desirable to achieve good duration of catalyst usage to limit expensive catalyst replacement, as well as to avoid catalyst contamination of product streams that could otherwise occur with excessive attrition. The Davison Jet Cup attrition test characterizes attrition resistance of particulate materials by exposing the material to turbulence in a jet cup and relating the fines loss to attrition. Davison Jet Cup attrition testing was carried out on reference materials of fluidized catalytic cracking (FCC) catalyst, which exhibited Davison Indices between 8 and 18. Various samples of the tungstated zirconia catalyst exhibited Davison Indices of 8, 12, and 27.

Example VI (Model Compound Testing)

Model compound studies are a convenient way to simplify complex chemistries and provide insight into deoxygenation mechanisms/pathways on selected catalysts under controlled conditions. Guaiacol (2-methoxy phenol) is a compound produced in biomass pyrolysis, having functional groups similar to those present in many products obtained from biomass pyrolysis oils.

To demonstrate the effectiveness of the tungstated zirconia RTI-A9 catalyst for deoxygenation of biomass pyrolysis vapors, guaiacol was introduced into a fixed bed micro reactor packed with the catalyst. Reactions were carried out at 400-500° C. with a liquid hourly space velocity (LHSV), the ratio of the hourly volume of oil processed to the volume of catalyst, of 0.3 $hr^{-1}$. Nitrogen was used as a carrier gas with a flow rate of 100 sccm. Products were determined by online mass spectrometer. Coke was determined by products during an oxidation step to regenerate the catalyst. Products during the oxidation step were also monitored by an online mass spectrometer.

Table 1 below sets out the product yield, in weight percent, from the deoxygenation of guaiacol with the RTI-A9 tungstated zirconia catalyst at varying temperatures. Product monitoring by mass spectrometer gave no indication of additional products.

TABLE 1

| Guaicol Deoxygenation Results with RTI-A9(7 μl/min feed, 100 sccm dilutant) | | | | | | | | | | | | |
|---|---|---|---|---|---|---|---|---|---|---|---|---|
| Temp. | Conv. | Product Yield (Weight %) | | | | | | | | | | Mass |
| (° C.) | (%) | $H_2O$ | $CO_2$ | Benzene | Toluene | Phenol | Cresol | CO | $CH_4$ | $H_2$ | Coke | Balance |
| 400 | 78.9 | 15.5 | 0.7 | 1.4 | 2.7 | 17.0 | 8.9 | 0.0 | 0.3 | 0.1 | 29.6 | 99.0 |
| 450 | 96.2 | 21.0 | 1.6 | 8.0 | 4.9 | 22.2 | 6.1 | 0.0 | 0.7 | 0.2 | 35.3 | 104.1 |
| 500 | 99.3 | 22.5 | 3.0 | 17.3 | 3.5 | 14.2 | 2.6 | 2.5 | 1.6 | 0.4 | 38.2 | 106.5 |

As shown in Table 1, reaction temperature affected guaiacol conversion and the oxygenated product distribution. Conversion increased from 79% at 400° C. to greater than 99% at 500° C. Water content in the product also increased with increasing temperature, indicating that the dehydration activity of the catalyst is increasing with temperature. Phenol is a major product at all reaction temperatures, along with other partially or fully deoxygenated products.

In the deoxygenation operation, removal of the methoxy group from guaiacol is the most facile pathway. At the tested lower temperature condition phenol is the dominant product, and coke and water are the other primary products. At more severe conditions, guaiacol conversion increases, additional oxygen is removed as carbon dioxide, and benzene/toluene yields increase significantly. Formation of benzene and toluene may result from deoxygenation of the phenol product. This was observed when the temperature was increased to 500° C. and benzene and toluene yields increased at the expense of the phenol. The production of water, carbon monoxide, and carbon dioxide indicate that the tungstated zirconia RTI-A9 catalyst was able to catalyze deoxygenation through multiple pathways (dehydration, decarboxylation, and decarbonylation).

During catalytic fast pyrolysis, coke on the catalyst surface needs to be periodically removed in an oxidation step, in order to regenerate the catalyst and recover deoxygenation capacity (activity). Over time, catalyst deactivation can occur if carbon cannot be effectively removed or if local hot spots form during repeated regeneration cycles so that catalyst sintering occurs.

An automated dual-fixed bed micro reactor system was utilized to evaluate long-term catalyst stability with respect to repeated deoxygenation and regeneration steps. Guaiacol conversion over the tungstated zirconia RTI-A9 catalyst was measured over 100 reaction/regeneration cycles. Two grams of the catalyst was loaded into the fixed bed reactor that was maintained at a temperature of 450° C. During the reaction step, 7 µL/minute of guaiacol was fed with 100 sccm of 20% argon in nitrogen over the catalyst for 60 minutes. The regeneration step followed, utilizing 50 sccm of air and 50 sccm of nitrogen flowing over the catalyst for 35 minutes to oxidize any coke formed on the catalyst.

These reaction conditions established a high initial activity, with over 90% conversion, without reaching complete conversion. This cycle is repeated 101 times with the same catalyst loading. The testing was completed over 12 days. The last 6 days involved continuous automated operation of the micro reactor system.

Figure 9:
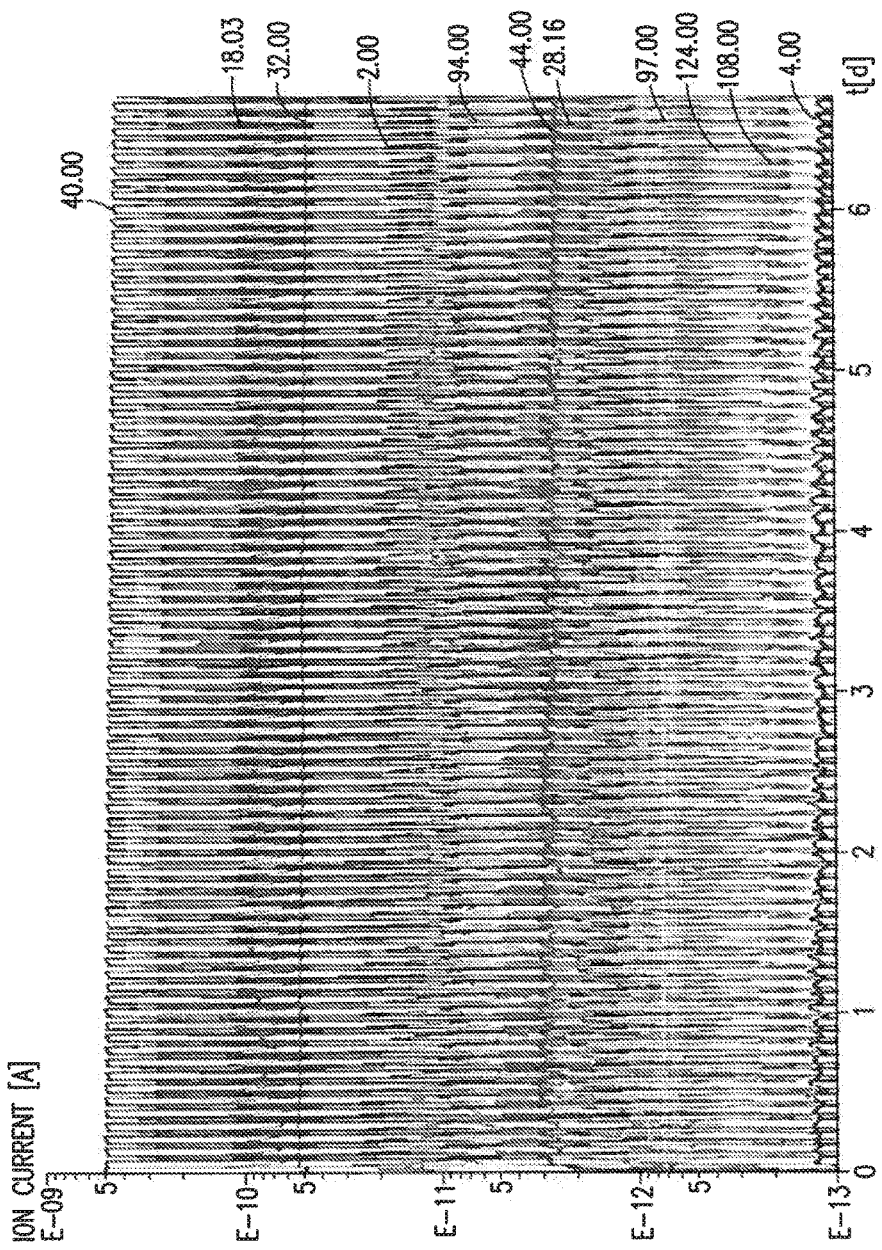
FIG. 9 is a computer screen shot of mass spectrometer data from 6 days of testing tungstated zirconia catalyst (Sample RTI-A9-3), covering 75 cycles of reaction/regeneration, using guaiacol as a model compound in an automated fixed bed micro reactor system.
Figure 10:
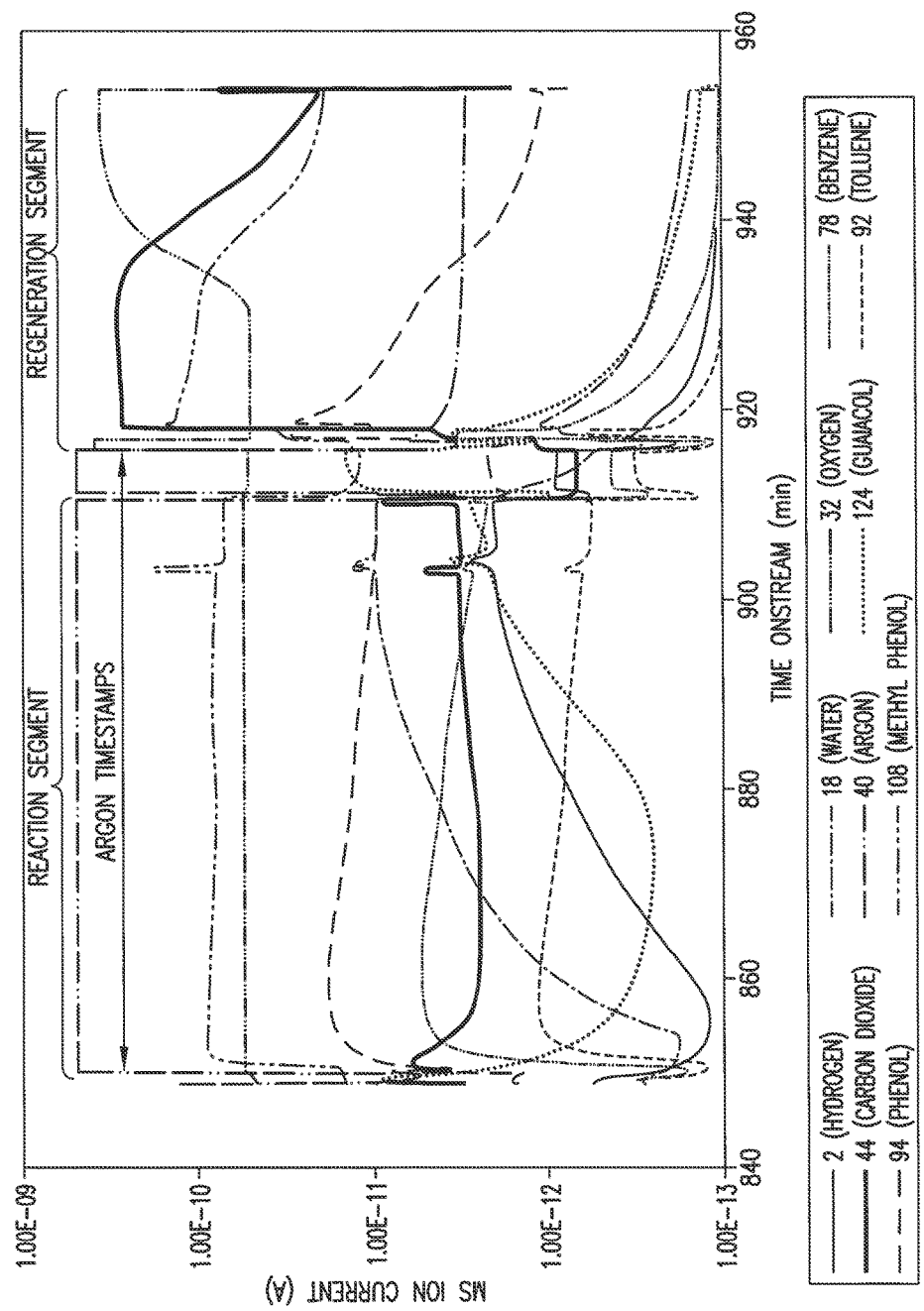
FIG. 10 shows the mass spectrometer data from a single cycle in extended testing (100 reaction/regeneration cycles) for guaiacol deoxygenation with the tungstated zirconia RTI-A9 catalyst at 450° C.

The products and un-reacted guaiacol from the micro reactor system are measured with an online mass spectrometer (MS). FIG. 9 is a computer screen shot of the mass spectrometer data from the last 6 days of testing, covering 75 cycles of reaction/regeneration using guaiacol as a model compound in a micro reactor system. FIG. 10 shows the mass spectrometer data from a single cycle in the extended testing (100 reaction/regeneration cycles) for guaiacol deoxygenation with the tungstated zirconia RTI-A9 catalyst at 450° C.

The change in the argon (40) signal, caused by valve switching, provides a timestamp in the data to indicate the beginning of new reaction and regeneration segments. The integrated area under the selected mass spectrometer signals during each segment is calculated to determine relative product concentrations. During guaiacol deoxygenation, several distinct mass signals are monitored to follow the evolution of various products. These mass signals and their associated products are listed in FIG. 10. A mass spectrometer response factor for each molecule can be determined to convert these relative measurements into absolute product concentrations, but since the mass spectrometer response factor is both the denominator and numerator, only the two guaiacol areas are needed to determine conversion according to the following equation:

$$\text{Guaiacol Conversion} = 100\% * \left(1 - \frac{\text{Area of Guaiacol during Reaction} * \text{Guaiacol } MS \text{ Response Factor}}{\text{Area of Guaiacol in baseline for equal reaction time} * \text{Guaiacol } MS \text{ Response Factor}}\right)$$

Product distribution is determined as area percent of the carbon containing products. The response factor for water is significantly higher than the carbon products, making it difficult to compare those products when water is included in that area.

Figure 11:
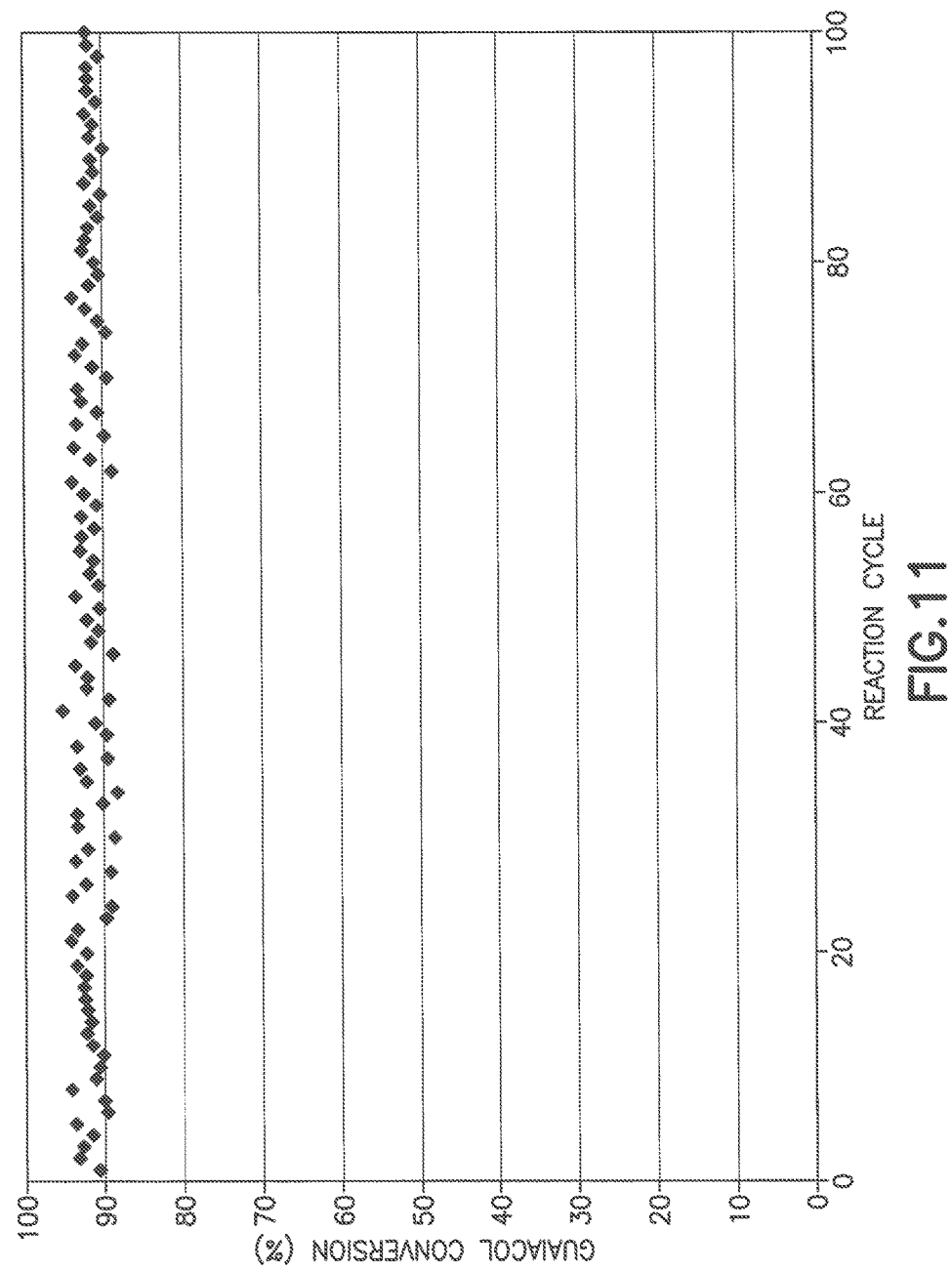
FIG. 11 is a graph of percent guaiacol conversion for each cycle shown in FIG. 9 during extended testing of guaiacol deoxygenation with tungstated zirconia RTI-A9 catalyst at 450° C.

High guaiacol conversion was maintained for the duration of the extended testing, indicating no observable loss of initial activity after repeated catalyst regeneration. Conversion data are plotted in FIG. 11 for guaiacol conversion for each cycle during the extended testing of guaiacol deoxygenation with the tungstated zirconia RTI-A9 catalyst at 450° C. Over the first 10 cycles, the average conversion was 91.9%. Over the last 10 cycles, the average conversion was 91.6%. Ten cycles correspond to approximately one day. Standard deviation of guaiacol conversion during the extended testing was 1.5%, indicating that the difference between conversion on the first day and on the last day is insignificant. If catalyst deactivation caused a decrease in guaiacol conversion of 0.5% per day over the 10 day period, the conversion would have dropped 4%.

In addition to guaiacol conversion, the product distribution over the cycles remained constant. The products as described by their area percent of the total mass spectrometer signal area, excluding water, are shown in FIG. 12.

Figure 12:
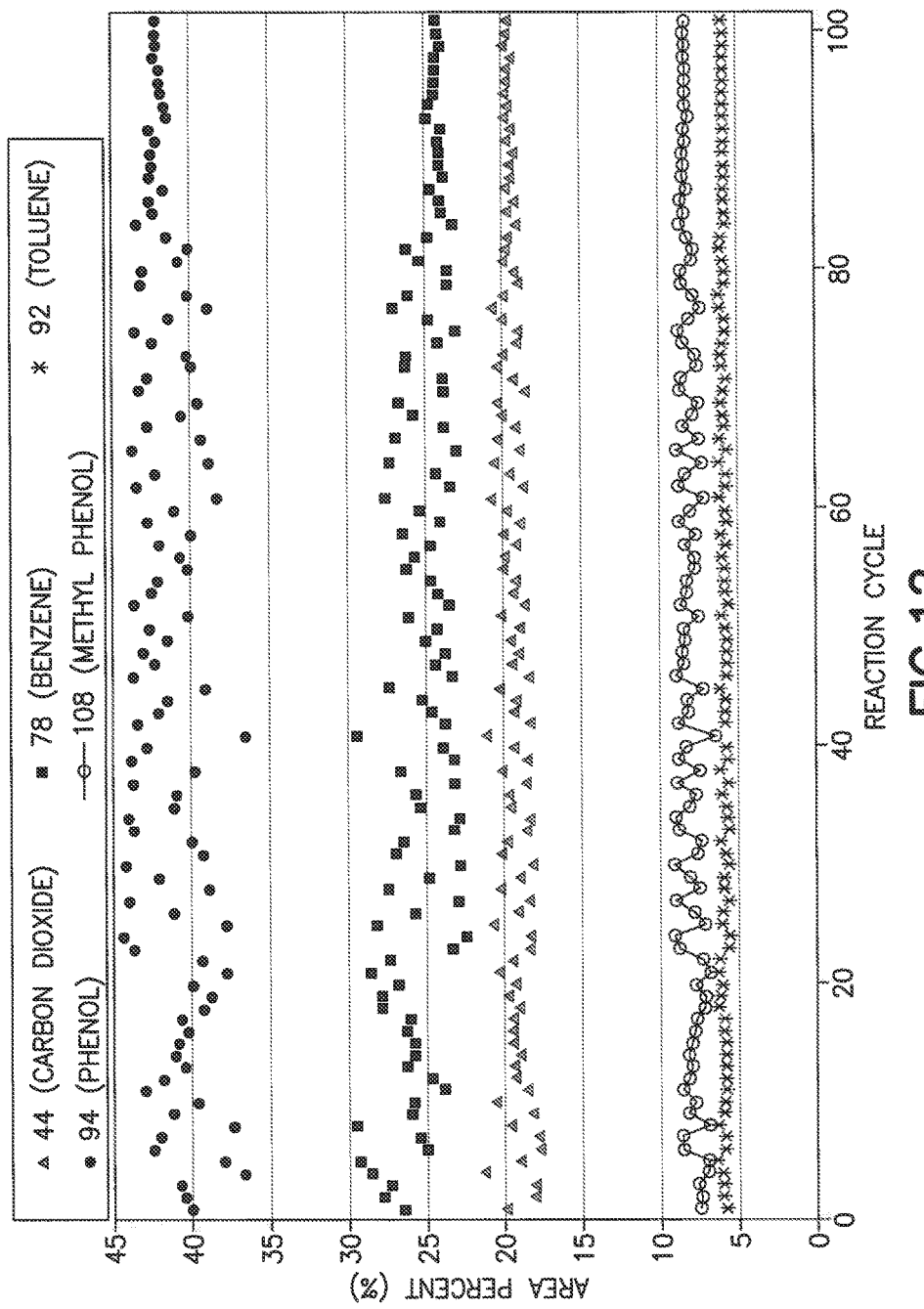
FIG. 12 is a graph of product distribution from each cycle shown in FIG. 9 during extended testing of guaiacol deoxygenation with the tungstated zirconia RTI-A9 catalyst, excluding the water signal, shown as an area percent, for each of carbon dioxide, benzene, toluene, phenol, and methyl phenol.

FIG. 12 thus is a graph of product distribution from each cycle during extended testing of guaiacol deoxygenation with the tungstated zirconia RTI-A9 catalyst, excluding the water signal, shown as an area percent, for each of carbon dioxide, benzene, toluene, phenol, and methyl phenol.

These results demonstrate the stable activity of the tungstated zirconia RTI-A9 catalyst through 100 reaction/regeneration cycles.

Example VII (Catalytic Fast Pyrolysis)

Catalytic fast pyrolysis with the tungstated zirconia RTI-A9 catalyst was carried out to produce a bio-crude with oxygen content below 20 wt %. Testing was carried out in a fluidized bed micro-reactor system that allowed biomass to be fed directly into the catalyst bed where pyrolysis was conducted. The fluidized bed micro-reactor system comprised a 1 inch diameter quartz reactor tube housed in a variable temperature furnace. An inert bed of silicon carbide (16 grit) acted as a support for the catalyst bed. Biomass solids were injected through a 0.25 inch diameter tube inserted through the silicon carbide bed such that the opening was just below the catalyst bed. Biomass particles were entrained in a stream of nitrogen delivered by a mass flow controller arranged to convey them into the reactor, with the flow rate being adjusted to fully entrain the biomass solids. Additional nitrogen was also added to the bottom of the reactor to maintain fluidization in the catalyst bed. The exit region of the reactor had a disengagement zone for solids collection. Liquid products were collected by a condensation train comprising a heat exchanger, and ice cooled impinger, a dry ice cooled impinger and an electrostatic precipitator. A microGC gas chromatograph was used for online permanent gas analysis.

Fast pyrolysis generates a bio-oil with oxygen content similar to that of the initial feedstock. Table 2 shows the characteristics of feedstock, liquid products, and char for a white oak feedstock. Table 3 shows the product distribution from a fast pyrolysis and catalytic fast pyrolysis of white oak feedstock, in which the catalytic fast pyrolysis process utilized the tungstated zirconia RTI-A9 catalyst. The liquid product is a mixture of water and organic liquids. In fast pyrolysis, this typically remains a single phase for white oak, but in the catalytic fast pyrolysis separates into an aqueous phase and organic phase.

TABLE 2

Fast Pyrolysis White oak characterization of feedstock, liquid products, and char.

|  | Baseline Bio-Oil | Biomass (White Oak) | Baseline Char |
|---|---|---|---|
| Proximate Analysis (wt %) | | | |
| Volatile Matter | 65.9 | 75.2 | 25.5 |
| Fixed Carbon | 8.1 | 17.4 | 68.0 |
| Ash | 0.07 | 0.39 | 4.32 |
| LOD | 26.00 | 7.0 | 2.3 |
| Higher Heating Value (BTU/lb, dry) | 9570 | 8250 | 12200 |

TABLE 2-continued

Fast Pyrolysis White oak characterization of feedstock, liquid products, and char.

|  | Baseline Bio-Oil | Biomass (White Oak) | Baseline Char |
|---|---|---|---|
| Ultimate Analysis (wt %, dry) | | | |
| Carbon | 55.64 | 49.82 | 77.11 |
| Hydrogen | 6.18 | 5.86 | 3.07 |
| Oxygen (by difference) | 37.97 | 43.81 | 15.22 |
| Nitrogen | 0.12 | 0.10 | 0.27 |
| Sulfur | 0.01 | 0.01 | 0.02 |
| Ash | 0.07 | 0.39 | 4.32 |

TABLE 3

Product distribution from white oak fast pyrolysis and catalytic fast pyrolysis with RTI-A9.

|  | Baseline | RTI-A9 |
|---|---|---|
| Solids (wt %) | 14.3 | 19.8 |
| Gas (wt %) | 11.6 | 23.9 |
| Water (wt %) | 18.4 | 28.7 |
| Organic liquids, dry (wt %) | 49.4 | 24.8 |
| Bio-crude Composition (wt %) | | |
| C | 55.6 | 72.8 |
| H | 6.2 | 7.2 |
| O | 38.0 | 19.9 |
| Gas composition (vol %) | | |
| $H_2$ | 1.5 | 7.7 |
| CO | 25.4 | 37.1 |
| $CO_2$ | 42.1 | 32.6 |
| $CH_4$ | 3.5 | 10.6 |
| $C_{2+}$ | 27.4 | 12.0 |

Catalytic fast pyrolysis with the tungstated zirconia RTI-A9 catalyst produced a liquid product whose dry oxygen content was below 20 weight percent, a significant reduction from the fast pyrolysis bio-oil. The catalyst fast pyrolysis results were consistent with a model compound testing in that evidence of dehydration, decarbonylation, and decarboxylation are all presented by increases in the yields of water, carbon monoxide, and carbon dioxide. The organic product also has improved properties by a greater than 60% reduction in the total acid number, indicating reduction in acids, and a less corrosive nature of the product, as compared to the fast pyrolysis oil product.

Additionally, when attempting to vaporize liquid product at 350° C., a temperature similar to many potential processing steps, only 48% of the fast pyrolysis liquid organic product was vaporized. For the catalytic fast pyrolysis product, 82% was vaporized when the liquid product was heated to 350° C.

Based on these results, it appears that reducing oxygen content of the bio-oil will improve the bio-oil stability.

The chemical composition of the bio-crudes from fast pyrolysis and catalytic fast pyrolysis were characterized using GCxGc-ToFMS (Gas chromatographyxgas chromatography—Time of Flight Mass Spectrometer) analysis.

Table 4 contains a compositional comparison of liquid products from fast pyrolysis and catalytic fast pyrolysis of white oak feedstock, wherein the catalytic fast pyrolysis utilized the tungstated zirconia RTI-A9 catalyst, and the components of the liquid products were determined by GCxGc-ToFMS analysis.

TABLE 4

Compositional comparison of liquid products from fast pyrolysis and RTI-A9 catalytic fast pyrolysis of white oak by GCxGC-TOFMS analysis

|  | Fast Pyrolysis | Catalytic Fast Pyrolysis |
|---|---|---|
| Catalyst | None | RTI-A9 |
| Compound classes expresses in spectra area percent | | |
| Acids | 1.8 | 2 |
| Furans | 5.4 | 6.3 |
| Ketones | 11.7 | 11.5 |
| Phenols | 4.7 | 14.1 |
| Methoxyphenols | 8 | 14.1 |
| Dimethoxyphenols | 33.1 | 12.6 |
| Polyoxygen compounds | 5.3 | ND |
| Sugars | 14.4 | 0.6 |
| Hydroxy-PAHs | ND | 15.7 |
| Paraffins | 0.2 | 0.8 |
| monoaromatics | 0.8 | 1.5 |
| Fluorenes | ND | 1.9 |
| Phenanthrenes | ND | 2.8 |
| Pyrenes | ND | 2.2 |
| Higher PAHs | ND | 4.9 |
| Unknown | 11.1 | 4.2 |

Table 4 shows that the catalytic fast pyrolysis process achieved a significant reduction in sugars, dimethoxyphenols, and polyoxygen compounds, and a significant increase in phenols and deoxygenated aromatic products, as compared to the baseline bio-oil composition. Thus, the catalytic pyrolysis process using the tungstated zirconia RTI-A9 catalyst produced a bio-crude with a higher concentration of deoxygenated products, in relation to the fast pyrolysis process utilizing no catalyst.

The catalytic fast pyrolysis process utilizing the tungstated zirconia RTI-A9 catalyst yielded a bio-oil with lower oxygen content having improved properties such as better thermal conductivity and lower acid content, although the mass yield was lower. The baseline bio-oil has poor processability because the residual from reheating produces significant carbon, resulting in significant loss during upgrading to fuels.

Catalytic fast pyrolysis had lower carbon conversion efficiency in the bio-crudes, but the intermediates generated in catalytic fast pyrolysis entail easier downstream processing. Catalytic fast pyrolysis using the tungstated zirconia RTI-A9 catalyst produced a bio-oil with less than 20 wt % oxygen and achieved a significant carbon conversion efficiency, with 40% of the feedstock carbon being recovered in the bio-crude.

Figure 13:
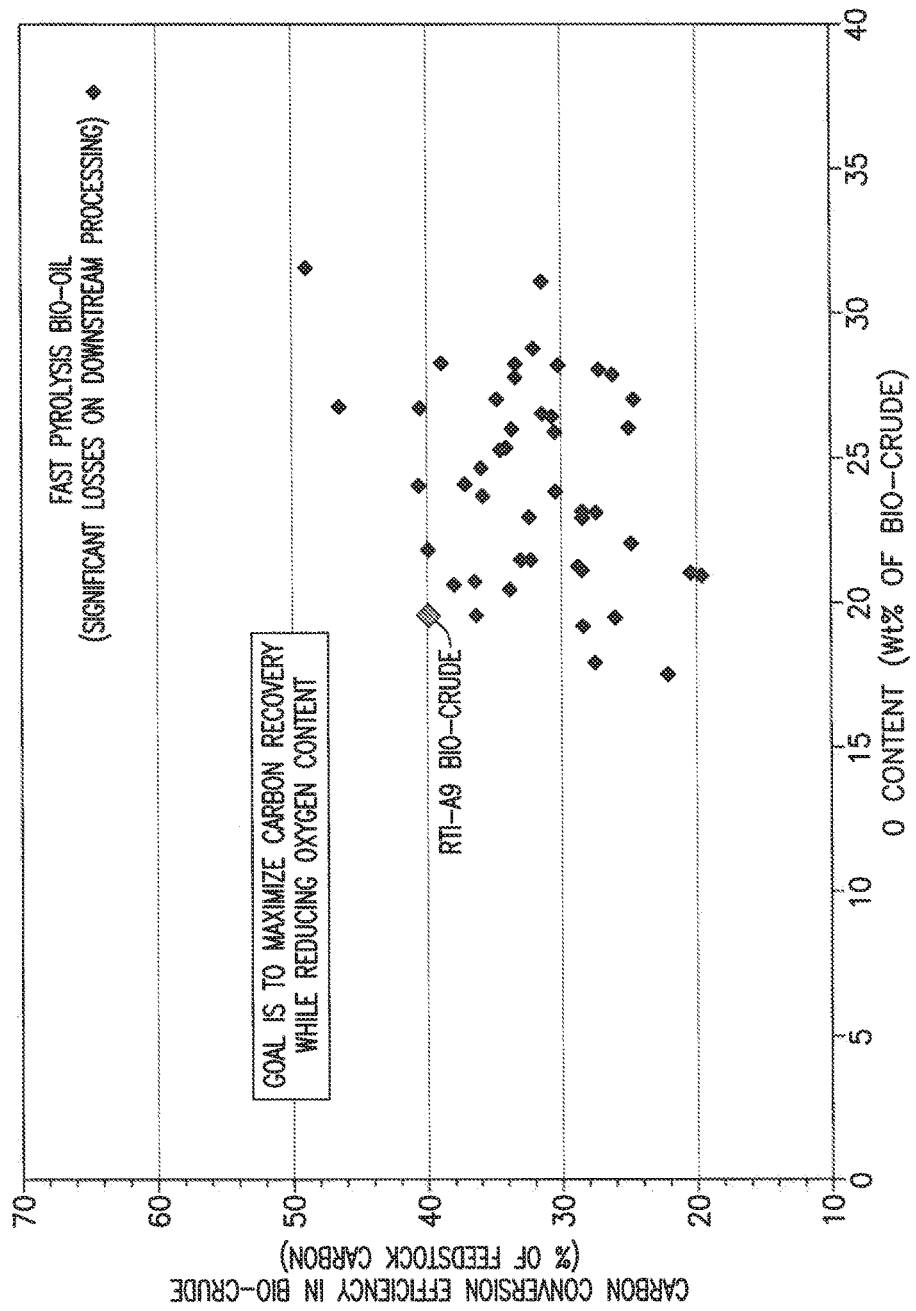
FIG. 13 is a graph of carbon conversion efficiency to bio-crude prior to hydroprocessing (as a percentage of feedstock carbon) plotted as a function of oxygen content (as a weight percent of the bio-crude), for bio-crude produced by catalytic fast pyrolysis with various catalyst materials, and for bio-crude produced by pyrolysis of white oak feedstock using the tungstated zirconia RTI-A9 catalyst.

FIG. 13 is a graph of carbon conversion efficiency to bio-crude prior to hydroprocessing, as a percentage of feedstock carbon, plotted as a function of oxygen content as a weight percent of the bio-crude. The plotted data include carbon conversion efficiency data for bio-crude produced by catalytic fast pyrolysis with various catalyst materials, and the carbon conversion efficiency for bio-crude produced by pyrolysis of white oak feedstock using the RTI-A9 catalyst.

As indicated on the graph, the objective is to maximize carbon conversion efficiency while reducing oxygen content.

The fast pyrolysis bio-crudes variously contained oxygen at concentrations in a range of 17-32 wt %, based on weight of the bio-crude. Carbon conversion efficiency for such bio-crudes was in the range of 20-50%. These higher-oxygen bio-crudes are expected to experience significant losses in downstream processing.

The bio-crude produced using the RTI-A9 catalyst contained 20 wt % oxygen. Carbon conversion efficiency for this bio-crude was approximately 40%. The use of the RTI-A9 catalyst therefore enabled the high carbon conversion efficiency production of bio-crude that had low oxygen content, rendering it suitable for downstream processing without significant yield loss.

Example VIII (Catalytic Fast Pyrolysis of Corn Stover)

The tungstated zirconia RTI-A9 catalyst was also used for catalytic fast pyrolysis of corn stover. Corn stover has a higher ash content than white oak feedstock, and results in higher char/solid yield than the white oak feedstock. The product distribution from corn stover fast pyrolysis and catalytic fast pyrolysis using the RTI-A9 catalyst is set out in Table 5 below, and Table 6 lists the chemical composition from the bio-crude products with corn stover. The chemical composition of the bio-crude from corn stover catalytic fast pyrolysis is similar in composition to the white oak catalytic fast pyrolysis bio-crude.

TABLE 5

Product distribution from corn stover fast pyrolysis and catalytic fast pyrolysis with RTI-A9.

| Catalyst | None | RTI-A9 |
| --- | --- | --- |
| Product Yields (wt % of fed biomass) | | |
| Solids (wt %) | 20.4 | 22.7 |
| Gas (wt %) | 19.9 | 22.2 |
| Water (wt %) | 27 | 30.0 |
| Bio-crude, dry (wt %) | 35 | 18.7 |
| Bio-crude Composition (wt %) | | |
| C | 58 | 73 |
| H | 6 | 7 |
| O | 36 | 20 |
| Gas composition (vol %) | | |
| $H_2$ | 3.9 | 8.1 |
| CO | 41.2 | 37.2 |
| $CO_2$ | 41.6 | 42.4 |
| $CH_4$ | 8.3 | 5.3 |

TABLE 6

Compositional comparison of liquid products from fast pyrolysis and RTI-A9 catalytic fast pyrolysis of corn stover by GCxGC-TOFMS analysis

| | Fast Pyrolysis | Catalytic Fast Pyrolysis |
| --- | --- | --- |
| Catalyst | None | RTI-A9 |
| Acids | 2.1 | 2.5 |
| Furans | 4.2 | 5.4 |
| Ketones | 31.5 | 11.2 |
| Phenols | 11.4 | 21.3 |
| Methoxyphenols | 10.8 | 14.8 |
| Dimethoxyphenols | 30.9 | 11.4 |
| Polyoxygen compounds | 2.4 | ND |
| Sugars | 2.8 | 0.9 |
| Hydroxy-PAHs | ND | 14.4 |
| Paraffins | 0.2 | 0.9 |
| monoaromatics | 0.3 | 2.9 |
| Fluorenes | ND | 1.9 |
| Phenanthrenes | ND | 3.1 |
| Pyrenes | ND | 2.1 |
| Higher PAHs | ND | 2.9 |
| Unknown | 3.4 | 4.3 |

While the disclosure has been set out herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the invention as hereinafter claimed is intended to be broadly construed and interpreted, as including all such variations, modifications and alternative embodiments, within its spirit and scope.

What is claimed is:

1. A catalyst useful for catalytic pyrolysis of biomass, said catalyst comprising:
    (i) matrix material comprising a support and/or binder, and
    (ii) at least one metal oxide on the matrix material, wherein the metal oxide comprises metal selected from the group consisting of tungsten, chromium, molybdenum, nickel, and combinations thereof,
    having an acid site loading, as measured by ammonia adsorption, in a range of from 3 to 10 mL of $NH_3$ per gram of catalyst,
    wherein the catalyst does not contain cobalt,
    wherein when the catalyst comprises a catalytic promoter, the catalytic promoter is elemental metal selected from the group consisting of platinum, palladium, ruthenium, nickel, molybdenum, hafnium, copper, iron, tin, manganese, magnesium, chromium, lanthanum, and combinations thereof, and
    wherein the metal oxide has a loading on the matrix material of from 10 to 20% by weight, based on total weight of the metal oxide and matrix material, with the proviso that when the metal oxide comprises tungsten oxide and the matrix material comprises zirconia, the tungsten oxide has a loading on the zirconia of from 15% to 17% by weight, based on total weight of the tungsten oxide and zirconia.

2. The catalyst of claim 1, wherein Lewis acid and Brønsted acid sites are present on the catalyst at a Lewis to Brønsted infrared band height ratio ($cm^{-1}/cm^{-1}$) in a range of from 0.1 to 50.

3. The catalyst of claim 1, wherein the metal oxide comprises tungsten oxide and the matrix material comprises zirconia.

4. The catalyst of claim 1, of particulate form, having an average particle size in a range of from 20 to 150 μm.

5. The catalyst of claim 1, having: a tap bulk density in a range of from 0.5 to 2.2 gm per cc of catalyst; a BET surface area in a range of from 20 to 150 $m^2$/gram; porosity providing a pore volume in a range of from 0.2 to 1.0 cc of pore volume per gram of catalyst; and an Attrition Index in a range of from 2 to 25.

6. The catalyst of claim 1, wherein the metal oxide comprises tungsten oxide.

7. The catalyst of claim 1, wherein the matrix material comprises a support comprising material selected from the group consisting of titania, alumina, silica, ceria, zirconia, zeolites, and compatible mixtures, alloys, and composites of two or more of the foregoing.

8. The catalyst of claim 1, comprising a zirconia support comprising tetragonal phase zirconia, wherein the metal oxide comprises tungsten oxide.

9. The catalyst of claim 1, further comprising a catalytic promoter selected from the group consisting of platinum, palladium, ruthenium, nickel, molybdenum, hafnium, copper, iron, tin, manganese, magnesium, chromium, lanthanum, and combinations thereof.

10. A catalyst useful for catalyzing pyrolysis of biomass, said catalyst comprising a zirconia support and tungsten oxide on the zirconia support at a tungsten oxide loading of from 15% to 17% by weight, based on total weight of zirconia and tungsten oxide, said catalyst being of particulate form with an average particle size in a range of from 20 to 150 μm, with an acid site loading, as measured by ammonia adsorption, in a range of from 3 to 10 mL of $NH_3$ per gram of catalyst, and wherein Lewis acid and Brønsted acid sites are present on the catalyst at a Lewis to Brønsted infrared band height ratio ($cm^{-1}/cm^{-1}$) in a range of from 0.1 to 50, wherein the catalyst does not contain cobalt, and wherein when the catalyst comprises a catalytic promoter, the catalytic promoter is elemental metal selected from the group consisting of platinum, palladium, ruthenium, nickel, molybdenum, hafnium, copper, iron, tin, manganese, magnesium, chromium, lanthanum, and combinations thereof.

* * * * *